United States Patent
Hadley et al.

(10) Patent No.: US 9,104,760 B2
(45) Date of Patent: Aug. 11, 2015

(54) PANOPTIC VISUALIZATION DOCUMENT DATABASE MANAGEMENT

(75) Inventors: Brent L. Hadley, Kent, WA (US); Patrick J. Eames, Newcastle, WA (US); Joseph F. Floyd, University Place, WA (US)

(73) Assignee: The Boeing Company, Chicago, IL (US)

( * ) Notice: Subject to any disclaimer, the term of this patent is extended or adjusted under 35 U.S.C. 154(b) by 421 days.

(21) Appl. No.: 13/428,686

(22) Filed: Mar. 23, 2012

(65) Prior Publication Data

US 2013/0166538 A1  Jun. 27, 2013

Related U.S. Application Data

(60) Provisional application No. 61/578,349, filed on Dec. 21, 2011, provisional application No. 61/578,357, filed on Dec. 21, 2011, provisional application No. 61/578,361, filed on Dec. 21, 2011.

(51) Int. Cl.
*G06F 17/30* (2006.01)
*G06F 3/0481* (2013.01)
*G06F 3/0483* (2013.01)

(52) U.S. Cl.
CPC ........ *G06F 17/30864* (2013.01); *G06F 3/0481* (2013.01); *G06F 3/0483* (2013.01); *G06F 17/30991* (2013.01); *G06F 17/30997* (2013.01)

(58) Field of Classification Search
CPC .................... G06F 17/30864; G06F 17/30991; G06F 17/30997
USPC ........................................................ 707/722
See application file for complete search history.

(56) References Cited

U.S. PATENT DOCUMENTS

| | | |
|---|---|---|
| 5,341,466 A | 8/1994 | Perlin et al. |
| RE36,145 E | 3/1999 | DeAguiar et al. |

(Continued)

FOREIGN PATENT DOCUMENTS

| | | |
|---|---|---|
| EP | 1 176 520 A2 | 1/2002 |
| EP | 1 503 301 A2 | 2/2005 |

(Continued)

OTHER PUBLICATIONS

European Search Report dated Aug. 7, 2013 for European Application No. 13 160 361.5; 6 pages.

(Continued)

*Primary Examiner* — Etienne Leroux
*Assistant Examiner* — Jared Bibbee
(74) *Attorney, Agent, or Firm* — Womble Carlyle Sandridge & Rice LLP

(57) ABSTRACT

A system includes a database management system engine, data manipulation subsystem and layout engine. The management system engine is configured to manage a database having stored therein a panoptic visualization document collection of document components each of which has associated metadata providing information about the respective document component, with the document components and metadata being stored in respective records of the database. The data manipulation subsystem includes a query language engine configured to receive a request for the respective records of document components and associated metadata, and the management system engine is configured to retrieve the requested, respective records from the database. The layout engine is configured to generate a layout of panoptically-arranged visual representations of the document components. And the query language engine is configured to communicate the layout and retrieved, respective records of the associated metadata.

22 Claims, 18 Drawing Sheets

(56) References Cited

U.S. PATENT DOCUMENTS

| | | | |
|---|---|---|---|
| 6,650,998 B1 | 11/2003 | Rutledge | |
| 6,684,087 B1 | 1/2004 | Yu et al. | |
| 6,704,024 B2 | 3/2004 | Robotham et al. | |
| 6,766,331 B2 | 7/2004 | Shema et al. | |
| 7,200,271 B2 | 4/2007 | Boose et al. | |
| 7,216,298 B1* | 5/2007 | Ballard et al. | 715/760 |
| 7,246,328 B2 | 7/2007 | Boose et al. | |
| 7,365,747 B2 | 4/2008 | Finlayson et al. | |
| 7,783,644 B1 | 8/2010 | Petrou et al. | |
| 7,802,204 B2 | 9/2010 | Merry et al. | |
| 7,870,224 B1 | 1/2011 | Maigatter | |
| 7,872,650 B2 | 1/2011 | Fay | |
| 7,921,452 B2 | 4/2011 | Ridlon et al. | |
| 8,051,031 B2 | 11/2011 | Sims, III et al. | |
| 2002/0193687 A1* | 12/2002 | Vining et al. | 600/425 |
| 2003/0055871 A1 | 3/2003 | Roses | |
| 2003/0100964 A1 | 5/2003 | Kluge et al. | |
| 2004/0003097 A1 | 1/2004 | Willis et al. | |
| 2004/0028294 A1 | 2/2004 | Fukuda | |
| 2004/0093564 A1 | 5/2004 | Kumhyr et al. | |
| 2004/0223648 A1 | 11/2004 | Hoene et al. | |
| 2004/0267701 A1 | 12/2004 | Horvitz et al. | |
| 2005/0081148 A1* | 4/2005 | Deganello et al. | 715/522 |
| 2006/0161863 A1 | 7/2006 | Gallo | |
| 2007/0073757 A1* | 3/2007 | Karlsson et al. | 707/102 |
| 2007/0094615 A1 | 4/2007 | Endo et al. | |
| 2007/0143339 A1* | 6/2007 | Springett | 707/103 R |
| 2007/0226605 A1 | 9/2007 | Thomas | |
| 2008/0074423 A1 | 3/2008 | Gan et al. | |
| 2008/0111813 A1 | 5/2008 | Gatzke et al. | |
| 2008/0154458 A1* | 6/2008 | Brandstetter et al. | 701/29 |
| 2008/0247636 A1 | 10/2008 | Davis et al. | |
| 2009/0086014 A1 | 4/2009 | Lea et al. | |
| 2009/0086199 A1 | 4/2009 | Troy et al. | |
| 2009/0112820 A1 | 4/2009 | Kessel et al. | |
| 2009/0138139 A1 | 5/2009 | Tsai et al. | |
| 2009/0161916 A1* | 6/2009 | Ma | 382/112 |
| 2009/0177962 A1* | 7/2009 | Gusmorino et al. | 715/243 |
| 2009/0317020 A1 | 12/2009 | Gerhard et al. | |
| 2010/0042361 A1 | 2/2010 | Hadley et al. | |
| 2010/0102980 A1 | 4/2010 | Troy et al. | |
| 2010/0223269 A1 | 9/2010 | Shuf et al. | |
| 2010/0229115 A1 | 9/2010 | Augustine et al. | |
| 2010/0306696 A1 | 12/2010 | Groth et al. | |
| 2011/0087463 A1 | 4/2011 | Nakhle et al. | |
| 2011/0087513 A1 | 4/2011 | Floyd et al. | |
| 2011/0149266 A1 | 6/2011 | Motzer et al. | |
| 2011/0235858 A1 | 9/2011 | Hanson et al. | |
| 2012/0188248 A1 | 7/2012 | Eames et al. | |
| 2012/0221625 A1 | 8/2012 | Troy et al. | |
| 2013/0282693 A1* | 10/2013 | Wang et al. | 707/710 |

FOREIGN PATENT DOCUMENTS

| | | |
|---|---|---|
| EP | 1 860 573 A1 | 11/2007 |
| EP | 2 482 538 A1 | 8/2012 |
| EP | 2 642 414 A2 | 9/2013 |
| WO | 2009005949 A1 | 1/2009 |

OTHER PUBLICATIONS

European Search Report dated Sep. 2, 2013 for European Application No. 13 160 848.1; 6 pages.

Rao et al., "Rich Interaction in the Digital Library," Apr. 1995, Communications of the ACM, Association for Computing Machinery, Inc., United States, vol. 38, No. 4, pp. 29-39.

European Search Report dated Dec. 12, 2013 for European Application No. 13 184 084.5, 6 pages.

European Search Report dated Mar. 6, 2013 for European Application No. 12198374.6, 7 pages.

European Search Report dated Mar. 12, 2013 for European Application No. 12198679.8, 8 pages.

European Search Report dated Mar. 19, 2013 for European Application No. 12195735.1, 7 pages.

EP Search Report dated May 15, 2012 for EP Appl. No. 12152591.9, 13 pgs.

"Futuristic software from Minority Report is real", 3 pages retrieved on Aug. 30, 2012 from http://www.foxnews.com/tech/2012/07/23/futuristic-software-from-minority-report-is-real/print.

Data differencing—Wikipedia, the free encyclopedia, 3 pages retrieved on Jul. 9, 2012 from http://en.wikipedia.org/w/index.php?title=Data_differencing&printable=yes.

International Search Report mailed on Jan. 18, 2013 in PCT/US2012/058937.

International Search Report mailed on Dec. 21, 2012 in PCT/US2012/054808.

Li et al., "Automated Generation of Interactive 3D Exploded View Diagrams," copyright Aug. 2008, ACM Transactions on Graphics, vol. 27, No. 3, 7 pages.

Quintana et al., "Will Model-based Definition replace engineering drawings throughout the product lifecycle? A global perspective from aerospace industry," copyright 2010, Computers in Industry, vol. 61, pp. 497-508.

Tatzgern et al., "Multi-Perspective Compact Explosion Diagrams," copyright Feb. 2011, Computers & Graphics, vol. 35, No. 1, pp. 135-147.

"Theodolite Documentation/Help/FAQ" 6 pages retrieved on Dec. 14, 2012 http://hunter.pairsite.com/mobile/theodolite/help/index.html.

Written Opinion mailed on Jan. 18, 2013 in PCT/US2012/058937.

Written Opinion mailed on Dec. 21, 2012 in PCT/US2012/054808.

"Hard Rock Memorabilia", 2 pages retrieved on Apr. 18, 2012 http://memorabilia.hardrock.com.

"Deep Zoom" 4 pages retrieved on Apr. 18, 2012 http://en.wikipedia.org/wiki/DeepZoom.

About Deep Zoom Composer, 4 pages retrieved on Nov. 23, 2011 http://msdn.microsoft.com/en-us/library/dd409068 (d=printer).aspx.

Airframe & Powerplant Mechanics General Handbook, US Department of Transportation Federal Aviation Administration, Chapter 2, pp. 35-52; Mar. 31, 1999.

European Search Report dated Apr. 4, 2014 for European Application No. 14 152 644.2, 8 pages.

European Search Report dated Apr. 4, 2014 for European Application No. 14 152 646.7, 9 pages.

Cohn, "Back to Flat—Producing 2D Output from 3D Models," Autodesk University 2009, Dec. 11, 2009, pp. 1-14.

Li et al., "Automated Generation of Interactive 3D Exploded View Diagrams," ACM Transactions on Graphics, vol. 27, No. 3, Aug. 1, 2008, 7 pages.

Petre et al., "3D Model-based Semantic Labeling of 2D Objects," 2011 International Conference on Digital Image Computing: Techniques and Applications (DICTA), IEEE, Dec. 6, 2011, pp. 152-157.

Tatzgern et al., "Multi-perspective Compact Explosion Diagrams," Computers & Graphics, vol. 35, No. 1, Feb. 1, 2011, pp. 135-147.

European Search Report dated Feb. 10, 2014 for European Application No. 13 194 943.0, 6 pages.

* cited by examiner

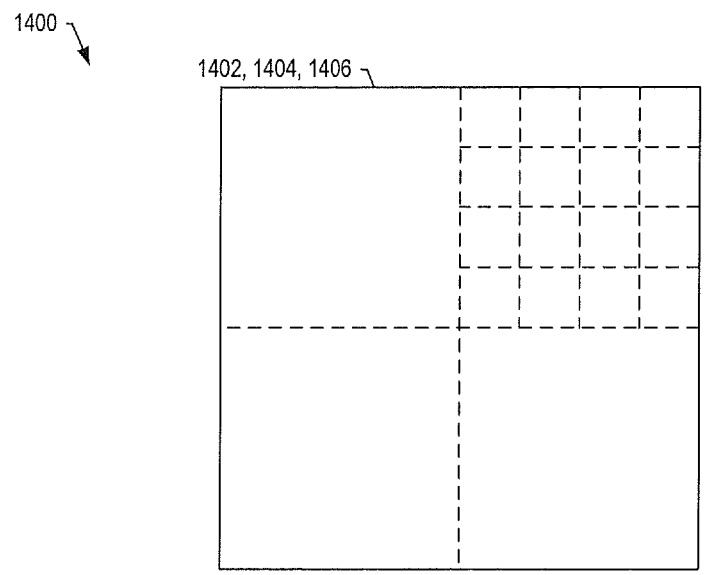
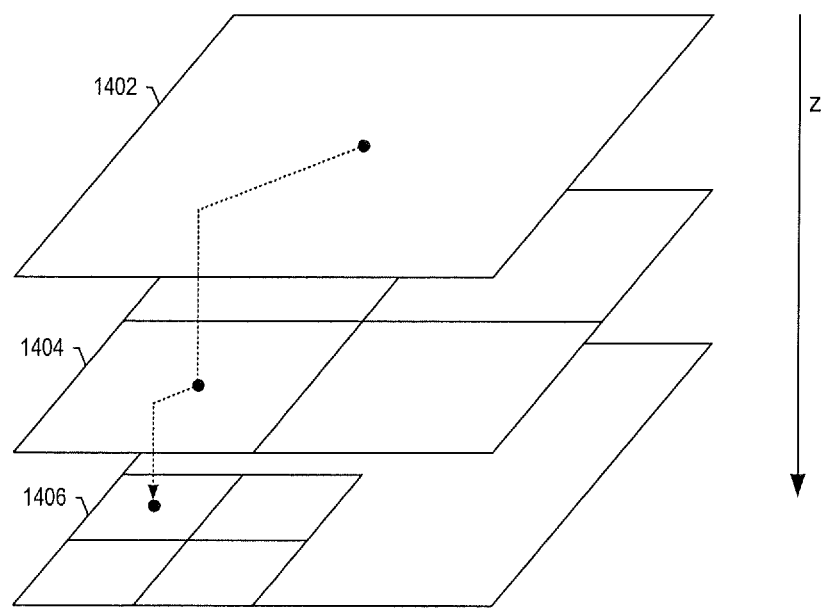
FIG. 14

PANOPTIC VISUALIZATION DOCUMENT DATABASE MANAGEMENT

CROSS-REFERENCE TO RELATED APPLICATION(S)

The present application is related to U.S. Provisional Patent Application No. 61/578,349, entitled: Panoptic Visualization Document Layout, U.S. Provisional Patent Application No. 61/578,357, entitled: Panoptic Visualization Document Navigation, and U.S. Provisional Patent Application No. 61/578,361, entitled: Panoptic Visualization Document Collection, all of which filed on Dec. 21, 2011. The present application is also related to U.S. patent application Ser. No. 13/072,217, entitled: Image Management and Presentation, filed on Mar. 25, 2011, which claims priority to U.S. Provisional Patent Application No. 61/436,585, entitled: Navigation to Aircraft Maintenance Information Using Tiled 2D Illustrations, filed on Jan. 26, 2011. The contents of all of the aforementioned are incorporated herein by reference in their entireties.

TECHNOLOGICAL FIELD

The present disclosure relates generally to panoptic visualization of documents and, in particular, to panoptic visualization of documents or their document components in a manner that reflects logical relationships between the documents/components.

BACKGROUND

Information printed about a topic is often printed on multiple pages because the information does not fit on a single page and/or is more effectively presented using multiple pages. The multiple pages may be in the same source or in multiple sources. For example, technical drawings of an aircraft may be printed such that different portions of the same diagram may be printed on different pages. Drawings of one assembly on the aircraft may be contained in one library or source, while drawings of another assembly may be contained in a second library or source.

Printed information may also be printed such that one document contains one level of detail about an object, while a second document contains a second level of detail about the same object. For example, a diagram of an aircraft may be printed such that the exterior of the aircraft is visible in the diagram. Another diagram of the same aircraft may be printed such that the exterior of the aircraft is obscured, but the interior of the aircraft is presented. Thus, a reader may use different diagrams to learn different information about the same object.

As another example, wiring diagrams of wiring systems are often printed across multiple pages because the graphical and textual information presented in the wiring diagram is too great to fit on a single page. Thus, a reader may change documents multiple times to learn information about an entire wiring system.

Documents such as engineering diagrams, technical drawings, wiring diagrams, and other suitable document types may be used in the maintenance of an aircraft. The documents are created to be viewed in printed form. However, such documents are commonly stored in electronic form and viewed on a display device of a data processing system. As a result, the reader looks through different documents that may be on different types of media. This type of review may be more time-consuming than desired to find information about an aircraft.

Documents regarding a complex system of systems such as an aircraft may therefore contain large amounts of information regarding the complex system and its components, subsystems and parts, and the connections and relationships among the respective elements of the complex system. The complexity of the system and the large amount of information often required to describe the system may increase not only the time required to study the documents, but the difficulty in comprehending the complex system and its elements. A user may not only require the time to review documents containing large amounts of information, but may also require the time and endure the difficulty of studying the information to understand the ways in which the complex system and its elements relate to each other.

Therefore, may would be desirable to have a method and apparatus that takes into account at least some of the issues discussed above, as well as possibly other issues.

BRIEF SUMMARY

Example embodiments of the present invention are generally directed to a panoptic visualization document database system, and corresponding method and computer-readable storage medium. In accordance with example embodiments, media content and associated metadata for a document collection may be stored in respective records of a database. The database may be managed for the insertion and/or retrieval of records, which for the retrieval of records, may include panoptically arranging the collection's media content. This type of arrangement may enable a user to see the content in a single view, and in an arrangement that facilitates a better understanding of the content, which may be otherwise difficult to comprehend. In the context of a complex system such as an aircraft including a number of components, subsystems and parts, the arrangement may not only lessen the time required to review documents containing large amounts of information, but may also lessen the time required and ease the difficulty studying the information to understand the ways in which the complex system and its elements relate to each other. Example embodiments may therefore ease the time required and difficulty to manage a database of even the most massive amounts of information contained in some document collections.

According to one aspect of example embodiments, the system includes a database management system engine configured to manage a database having stored therein a panoptic visualization document collection of a plurality of document components. Each of the components includes respective media content and has associated metadata providing information about the respective document component, and the document components and metadata are stored in respective records of the database.

The system of this aspect also includes a data manipulation subsystem coupled to the database management system engine. The data manipulation subsystem includes a query language engine configured to receive a request for the respective records of one or more document components and associated metadata from the database. The database management system engine is configured to execute the request, including retrieval of the requested, respective records from the database.

The system additionally includes a layout engine of the query language engine or coupled to the query language engine. The layout engine is configured to generate a layout of panoptically-arranged visual representations of the document components according to a layout model, and the retrieved, respective records of the one or more document components and associated metadata. And the query language engine is configured to communicate the layout and retrieved, respective records of the associated metadata, such as to a graphical user interface for simultaneous display thereby.

In one example, the layout engine is configured to select the layout model from a plurality of layout models, with the layout model being selected according to the retrieved, respective records of the associated metadata.

In one example, the document component(s) are of electronic document(s) of the panoptic visualization document collection, and the associated metadata for the document component(s) provides information about a type of the respective documents. In this example, the layout engine may be configured to select the layout model according to the type of the respective documents.

In one example, the associated metadata for the document component(s) provides information about the media content of the respective document components. In this example, the layout engine may be configured to select the layout model according to the media content of the one or more document components.

In one example, the associated metadata for each of the document component(s) provides information specifying a size, location and/or depth of the visual representation of the respective document component(s) in the layout. In this example, for each of the one or more document components, the layout engine may be configured to generate the layout according to the size, location and/or depth specified by the information provided in the associated metadata. Further to this example, for each of one or more of the document components, the size, location and/or depth may be specified relative to one or more others of the document components.

In other aspects of example embodiments, a method and computer-readable storage medium are provided for managing a database of documents for panoptic visualization. The features, functions and advantages discussed herein may be achieved independently in various example embodiments or may be combined in yet other example embodiments further details of which may be seen with reference to the following description and drawings.

BRIEF DESCRIPTION OF THE DRAWING(S)

Having thus described example embodiments of the invention in general terms, reference will now be made to the accompanying drawings, which are not necessarily drawn to scale, and wherein:

Figure 1:
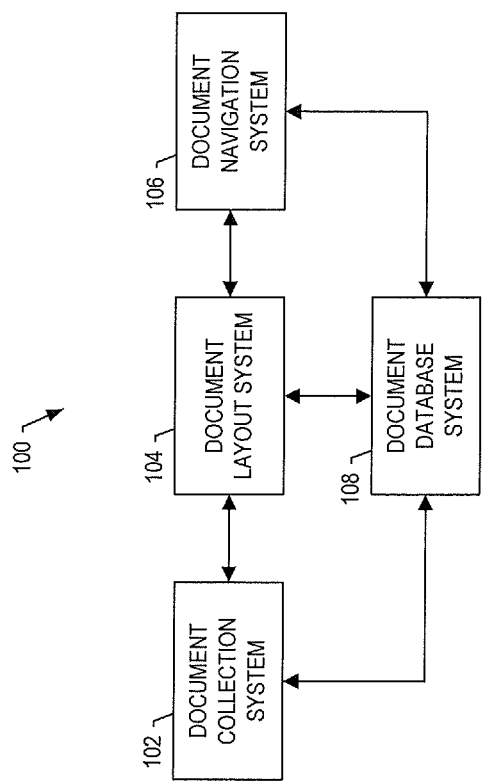
FIG. 1 is an illustration of a panoptic visualization system in accordance with an example embodiment.

FIGS. 6-17, which schematically illustrate examples of suitable layout models according to example embodiments; and FIGS. 18-23 depict example layouts of pages that may be displayed in a GUI that has a predetermined viewable area, and which may be navigated by a user, according to an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these example embodiments are provided so that this disclosure will be thorough and complete, and will fully convey the scope of the invention to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example embodiments of the present invention relate generally to panoptic visualization of documents and, in particular, to panoptic visualization of documents or their document components in a manner that reflects logical relationships between the documents/components. Example embodiments will be primarily described in conjunction with aerospace applications. It should be understood, however, that example embodiments may be utilized in conjunction with a variety of other applications, both in the aerospace industry and outside of the aerospace industry.

Referring now to FIG. 1, a panoptic visualization system 100 is illustrated according to example embodiments of the present invention. The system may include any of a number of different subsystems (each an individual system) for performing one or more functions or operations with respect to one or more electronic documents. As shown, for example, the system may include a document collection system 102, document layout system 104, document navigation system 106 and/or document database system 108. Although being shown as part of the panoptic visualization system, one or more of the document collection system, layout system, navigation system and/or database system may instead be separate from but in communication with the panoptic visualization system. It should also be understood that one or more of the subsystems may function or operate as a separate system without regard to others of the subsystems. And further, it should be understood that the panoptic visualization system may include one or more additional or alternative subsystems than those shown in FIG. 1.

As described herein, an electronic document (or simply document) may be any electronic media content capable of being visualized in an electronic and/or printed (or printable) form. The media content of a document may include one or more of textual, graphical or other visual content such as still images, video or the like. The document may be of a number of different types of documents in which the type of document may be defined by one or more characteristics of the document such as its format, media content or the like. Examples of suitable types of documents include computer-aided design documents (e.g., CAD, CATDrawing, CATPart, CATProduct, CATProcess, cgr, DWG, DXF, DWF, etc.), text-based documents (e.g., ANS, ASC, DOC, DOCX, HTML, PDF, RTF, TXT, WPD, etc.), presentation documents (e.g., PDP, PPT, etc.), graphics documents (e.g., BMP, GIF, JPEG, JP2, PNG, PSD, PSP, RAW, TIFF, etc.), video documents (e.g., AVI, MPEG, QuickTime, WMV, etc.) or the like. Other examples of suitable types of documents include single or collections of legal documents (e.g., court decisions, briefs, patents, etc.), books, articles, web pages, screenshots, service bulletins, engineering diagrams, warranties, technical drawings, wiring diagrams or the like. And still further examples of suitable types of documents include data sets such as engineering design data, wiring data, troubleshooting data, business data or the like.

A document may be composed of one or more constituent document components that may be groupings of its media content such as between basic breaking points. The document components may depend on the type of document and may include, for example, electronic pages, slides, diagrams, drawings, still images, videos or the like. The document component may at times be generally referred to as a "page," although the document component need not necessarily be an electronic page as it may include other types of components. In instances in which a document includes only one component, the document and its component may be one and the same.

As described herein, reference may be made to a document composed of constituent pages. It should be understood, however, that example embodiments may be equally applicable to a group (collection) of documents composed of constituent documents, which may or may not be further composed of constituent pages. Thus, functions performed with respect to a document may be equally performed with respect to a group of documents, and functions performed with respect to a page may be equally performed with respect to a constituent document.

Each page may be formed of data from which a visual representation of it (or rather its media content) may be generated in an electronic and/or printed (or printable) form. The visual representation of a page may at times be generally referred to as simply the page or as an "image," although the page need not necessarily include a still image as it may include other types of media content.

A page may include media content that has one or more subjects and includes one or more objects reflecting or otherwise forming the subject(s). At times, a page may therefore be said to depict its subject(s) and/or object(s) of its subject(s). As an example, a page may have an aircraft as its subject and include an exterior or interior view or sections of the exterior/interior view of the aircraft as object(s), or the page may have the exterior/interior view as its subject and include the sections of the exterior view as objects. As another example, a page may have an aircraft instrument panel as its subject and include gauges of the instrument panel as subjects.

Generally, documents and/or their pages according to example embodiments may have one or more logical relationships between one another. As explained in greater detail below, then, the document collection system 102 of the panoptic visualization system 100 may be generally configured to receive documents and collect pages according to these logical relationships, with the pages being collected as a document collection for panoptic visualization (a panoptic visualization document collection). The document layout system 104 may be generally configured to generate a layout of panoptically-arranged, logically-related pages of a panoptic visualization document collection, such as the collection from the document collection system. The document navigation system 106 may be generally configured to select and provide navigation option(s) for navigating a visual presentation of a layout of panoptically-arranged, logically-related pages of a panoptic visualization document collection, such as the layout generated by the document layout system. The document database system 108 may be generally configured to create and manage database(s) of documents and/or their pages, which have been or may be collected as a panoptic visualization document collection. The visual presentation of a layout may at times be generally referred to as simply the layout.

Example embodiments of the present invention may therefore collect pages of document(s) according to logical relationships between the pages, which in one example in the context of a complex system such as an aircraft, may reflect structural relationships between its elements. The pages may be panoptically arranged in a manner that reflects the logical relationships, and in various examples, structural relationships. The arrangement may enable a user to see the pages in a single view, and in a manner that facilitates a better understanding of relationships that may be otherwise difficult to comprehend. In the context of a complex system for example, the arrangement may not only lessen the time required to review documents containing large amounts of information, but may also lessen the time required and ease the difficulty studying the information to understand the ways in which the complex system and its elements relate to each other.

Reference will now be made to FIGS. 2, 3, 4 and 5, which illustrate more particular examples of a suitable document collection system, document layout system, document navigation system and document database system, respectively, according to example embodiments of the present invention.

Figure 2:
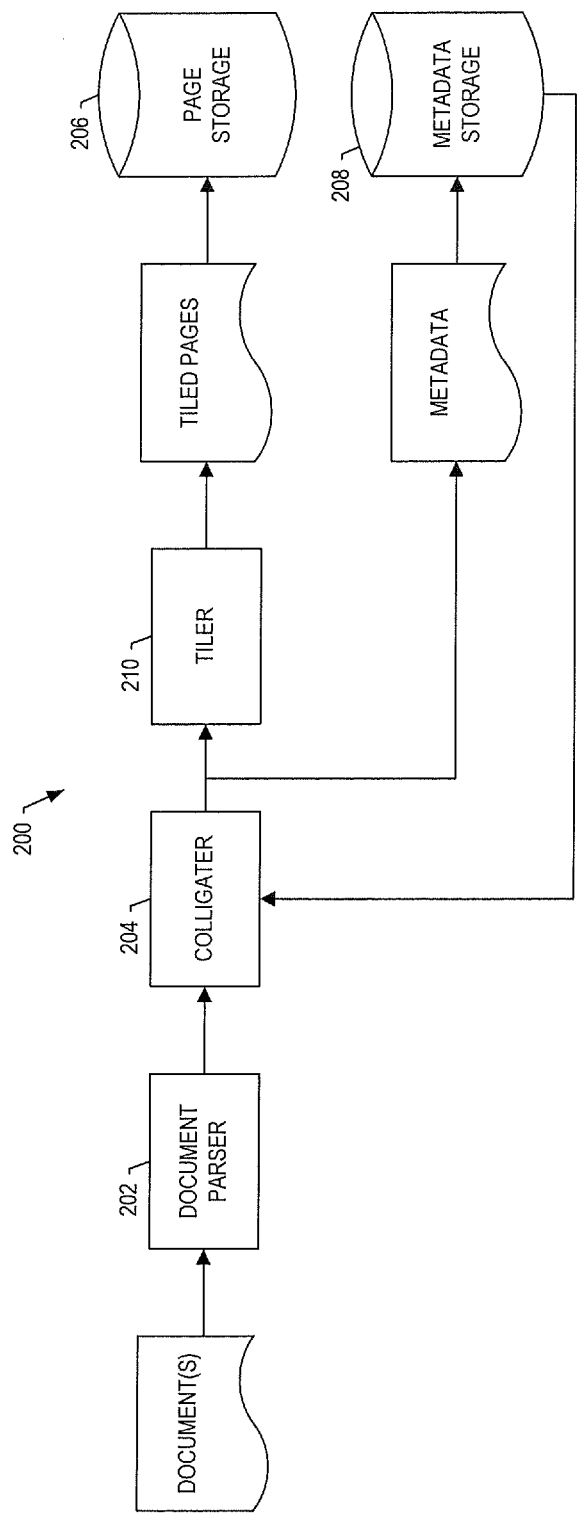
FIG. 2 is an illustration of a panoptic visualization document collection system in accordance with one example embodiment.

FIG. 2 illustrates a document collection system 200 according to one example embodiment. As shown, the document collection system may include a document parser 202 configured to receive and disassemble one or more electronic documents into a plurality of constituent pages (document components) each of which includes respective media content. The documents may be received from any of a number of different sources. For example, the documents may be received from storage such as file storage, database storage, cloud storage or the like. In a more particular example, the documents may be received from a document database system such as document database system 100 in which one or more documents may be stored in one or more databases, alone or along with other data.

The document parser 202 may be configured to disassemble documents in any of a number of different manners. In one example, the document parser may be may be configured to disassemble documents according to the type of the documents (e.g., computer-aided design documents, presentation documents, graphics documents, video documents, legal documents, books, articles, web pages, engineering diagrams, technical drawings, wiring diagrams, etc.). The document parser may therefore also be configured to identify the type of the documents, such as based on the format of the documents, business rules or by user input.

The document collection system 200 may also include a colligater 204 coupled to the document parser 202 and configured to colligate the pages. In this regard, the colligation of the pages may include, for each of one or more pages of the plurality, the colligater being configured to identify one or more links between the page and one or more other pages of the plurality. The link(s) of one example may be identified according to the documents, type of documents, and/or media content of the page and other page(s). And in one example, the link(s) may be defined according to one or more business rules, logic or the like. These link(s) may establish one or more logical relationships between the page and other page(s).

In one example, a link may be identified between pages sharing a common document (constituents of the same document). In one example, a link may be identified between pages adjacent one another in a predetermined sequence, such as a time sequence, spatial sequence or an order sequence in a common document or collection of documents. In some instances, a link may be identified according to the subject(s) or object(s) of the pages. For example, a link may be identified between pages sharing a common subject or common object. In one example, a link may be identified between pages in which an object of one is a subject of the other (object-subject), or in which a subject of one is an object of the other (subject-object).

In one example, a link may be identified between pages related by a parent-child relationship. In one example, a link may be identified between pages in instances in which one of the pages includes a reference or link to the other page in its media content. In this regard, a court decision may include a citation to another court decision (e.g., in the body of the court decision, or in a footnote, endnote or the like), or a page may include a hyperlink to another page. And in yet another example, a link may be identified between pages by user input specifying a link between pages.

In addition to identifying link(s) between pages, the colligator 204 may also be configured to extract, generate or otherwise provide, for each of one or more pages, metadata associated with the page. For a page, its associated metadata may provide any of a number of different pieces of information about the page. For example, the metadata may provide information identifying the link(s) between the page and other page(s) in metadata associated with the page. This information may include the names or other identifiers of the other page(s) linked to the page, and may also include an indication of the logical relationship(s) established by the link(s) therebetween (e.g., share common document, subject and/or object, adjacency, object-subject subject-object, parent-child, reference/link, user specified, etc.).

In addition to the link(s), the associated metadata for a page may include one or more other pieces of information about the page. For example, the metadata may provide information regarding the document for which the page is a constituent, such as the name or other identifier of the document, and/or an author, size, and/or time of creation or last revision of the document. Also for example, the metadata may provide information about one or more content restrictions applied or to be applied to the page, such as access restrictions, editing or modification restrictions, and/or encryption of the page.

The metadata may also provide information about the media content of the page. This information may include, for example, identification of the page's subject(s) and/or object(s), the portion of the page including one or more of the object(s), and/or a level of detail of one or more of the object(s) in the page. In various instances, a link between pages sharing a common subject, object or having an object-subject or subject-object relationship may be inferred from the metadata identifying the respective documents' subject(s) and/or object(s). In these instances, specification of a page's subject(s) and/or object(s) may suffice as information identifying the appropriate link(s) between pages.

In one example, the colligation of pages may further include the colligater 204 being configured to identify one or more layout models for at least some of the pages. In this example, the associated metadata extracted, generated or otherwise provided by the colligater for a page may further include information specifying an arrangement of the respective page in each of one or more of the layout models. For a respective layout model, this may include, for example, specifying a size, location and/or depth (z-order) of the page (or more particularly its visual representation). The layout model(s) may be identified and size, location and/or depth may be specified in any of a number of different manners, such as according to one or more business rules, logic or the like.

Examples of suitable layout models (sometimes referred to as styles of presentation) include brickwall, partial brickwall, hierarchy, shape, center out, top-down/triangulated, center-out triangulated, size dominance, overlap through detail, master-detail through depth, load shape, facet, mixed-media/static-and-dynamic or the like. Other examples may include combinations of one or more of the foregoing layout models. Each of a number of example layout models will be further described below.

In one example, the size of a page in a layout model may be specified as an absolute size or a relative size, either of which may be given in a number of different manners. In various instances, the size of the page may relate to a size in pixels and therefore give a pixel count or pixel resolution of the page. In one example, the absolute size of a page may be given in height and width dimensions (e.g., N×M pixels). In another example, the size of the page may be specified as a relative size based on the size of one or more other pages to which the page is logically related. For example, the relative size may be given in a number of different manners, such as in a percentage, fraction or multiple of other page(s); or the relative size may be given simply by an indication of smaller than, larger than or equal in size to other page(s). In pages related by a parent-child relationship, for example, the size of the child page may be specified as being half the size of its parent. In any event in which the size is relative, the size of the respective other page(s) may be given in their associated metadata, and may be given as an absolute size or relative size based on the size of even further other pages.

Similar to size, in one example, the location (sometimes referred to as position) of a page in a layout model may be specified as an absolute location or relative location, but in either event, may be given in a number of different manners. Likewise, the depth of a page in a layout model may be specified as an absolute depth or relative depth, either of which may be given in a number of different manners. For example, the absolute location of the page may be given in x, y coordinates of a coordinate system that spans the layout model, and/or the absolute depth may be given in a z coordinate of the coordinate system. In another example, the relative location of the page may be given in x, y coordinates relative to a point or other page(s) in the layout model. In yet another example, the relative location may be given simply by an indication of above, below, left or right of a point or other page(s) in the layout model. Similarly, in one example, the relative depth may be given simply by an indication of a page being in-front or behind other page(s) in the layout model. In any event in which the location and/or depth is relative, the location and/or depth of the respective other page(s) may be given in their associated metadata, and may be given as an absolute or relative location and/or depth.

The colligater 204 may be configured to communicate the pages and metadata as a panoptic visualization document collection, and communicate the collection to any of a number of different destinations. In one example, the colligater may be configured to communicate the pages and metadata to respective storage 206, 208 for later retrieval. The storage may be resident with the document collection system 200, or may be separate from and in communication with the document collection system. The pages and metadata may be formatted and stored in any of a number of different manners, and hence, their storage may be of any of a number of different types. Examples of suitable types of storage include file storage, database storage, cloud storage or the like.

In various examples, before pages are stored in respective storage 206, the pages may be compressed or otherwise processed for easier storage and retrieval. As shown, for example, the system may include a tiler 210 coupled to the colligater, and to which the colligater is configured to communicate the pages. The tiler may be configured to generate, for each of one or more pages, visual representations of the page at respective resolutions for zoom levels of the page. As described herein, the page (or rather its visual representation) at each zoom level may be generally referred to as a "sub-image," and may at times be considered a separate version or copy of the page. As suggested above, however, a sub-image of a page need not necessarily include a still image as the page may include other types of media content.

In addition to or in lieu of generating sub-images of a page, the tiler 210 may be configured to divide the sub-images across the zoom levels into progressively larger numbers of tiles each of which covers a spatial area of a sub-image at a respective zoom level. This may facilitate retrieval, panning and/or zooming of the page, as explained further below. The tiler may then be further configured to communicate the tiles of the sub-images of the pages, such as to the page storage. Before communicating the tiles, however, the tiler may be further configured to compress the tiles, if so desired.

In one more particular example, the tiler 210 may be configured to generate multiple resolutions of a page at respective zoom levels arranged hierarchically from a top zoom level through one or more intermediate zoom levels to a base zoom level. Each zoom level includes a sub-image of the entire page but at a different resolution; and the sub-images of the page across zoom levels may have the same native aspect ratio (ratio of the width of the image to its height). In one example, the top zoom level (level 0) may include a sub-image of the entire page at its lowest resolution, the one or more intermediate zoom levels may include a sub-image of the entire page at progressively higher resolutions (level 1 immediately below level 0, level 2 immediately below level 1, etc.), and the base zoom level (level L) may include a sub-image of the entire page at its highest (or full) resolution.

Each sub-image of a page may be generated in any of a number of different manners. In one example, one of the sub-images may be received by the tiler 210, such as the full-resolution sub-image. The tiler may then be configured to generate the other sub-images at lower resolutions, such as by downsampling the full-resolution sub-image.

As indicated, the tiler 210 may be configured to divide sub-images across zoom levels into progressively larger numbers of tiles each of which covers a spatial area of a sub-image at a respective zoom level. The tiles may have a fixed size (resolution) within and across the zoom levels, and accordingly, a sub-image composed of a larger number of tiles may generally have a higher resolution than a sub-image composed of a smaller number of tiles. Each zoom level may therefore be considered a higher zoom level relative to any zoom level above it (the sub-image at the zoom level being at a higher resolution than the sub-image at any zoom level above it). Similarly, each zoom level may be considered a lower zoom level relative to any zoom level below it (the sub-image at the zoom level being at a lower resolution than the sub-image at any zoom level below it).

In one example, the sub-image at each zoom level may be half the resolution of the zoom level immediately below it, and twice the resolution of the zoom level immediately above it (the resolutions increase or decrease by a factor of two). In this example, the number of tiles in a zoom level l may be given by $t_l = t_0 \times 4^l$, in which l=0, 1, 2, ... L, and $t_0$ represents the number of tiles in the top zoom level (level 0). In a more particular example including four zoom levels 0, 1, 2 and 3 (L=3), and in which the top zoom-level sub-image is composed of 1 tile ($t_0$=1), the first intermediate zoom-level (level 1) sub-image may be composed of 4 tiles, the second intermediate zoom-level (level 2) sub-image may be composed of 16 tiles, and the base zoom-level (level 3) sub-image may be composed of 64 tiles.

In one example, a page covered by a number of tiles in one zoom level may be covered by an increased or decreased number of tiles in higher or lower zoom levels, respectively, thereby leading to an increase or decrease in resolution of the page. Similarly, an area of a page covered by one tile in one zoom level may be covered by multiple (e.g., four) tiles in an adjacent higher zoom level, thereby leading to an increase in resolution of the respective area of the page. And an area of a page covered by multiple tiles in one zoom level may be covered by one tile in an adjacent lower zoom level, thereby leading to a decrease in resolution of the respective area of the page.

In one example, a page (or area thereof) at a particular resolution may be displayed by the tile(s) covering the page at the zoom level commensurate with the particular resolution. A zoom-in of the page may be effectuated by replacing the displayed tile(s) with the increased number of tiles covering the page at a higher zoom level. And a zoom-out of the page may be effectuated by replacing the displayed tiles with the decreased number of tile(s) covering the page at a lower zoom level. And because the page may be divided into tiles, in instances in which a portion but not all of a page is viewable in a graphical user interface (GUI) in which the page is displayed, only those tiles covering the viewable portion of the page may be retrieved and displayed.

As indicated above, page and metadata respective storage 206, 208 may be of any of a number of different types including, for example, database storage. In various examples described more fully below, the respective storage and one or more of the document parser 202, colligater 204 or tiler 210 may be included within or otherwise coupled to a document database system such as document database system 100. In various examples, the document database system may receive an insertion request to add data to database(s) of the document database system, or a retrieval request for data from its database(s). The request may relate to document(s), pages and/or metadata not yet having been processed by any one or more of the document parser, colligater or tiler. In such instances, as appropriate, the document database system may respond to the request at least in part by causing the respective document parser, colligater and/or tiler to process the document(s), pages and metadata such as in a manner described above. The document database system may then store the resulting panoptic visualization document collection in its database(s) (respective storage) —and if in response to a retrieval request, provide the requested data.

Figure 3:
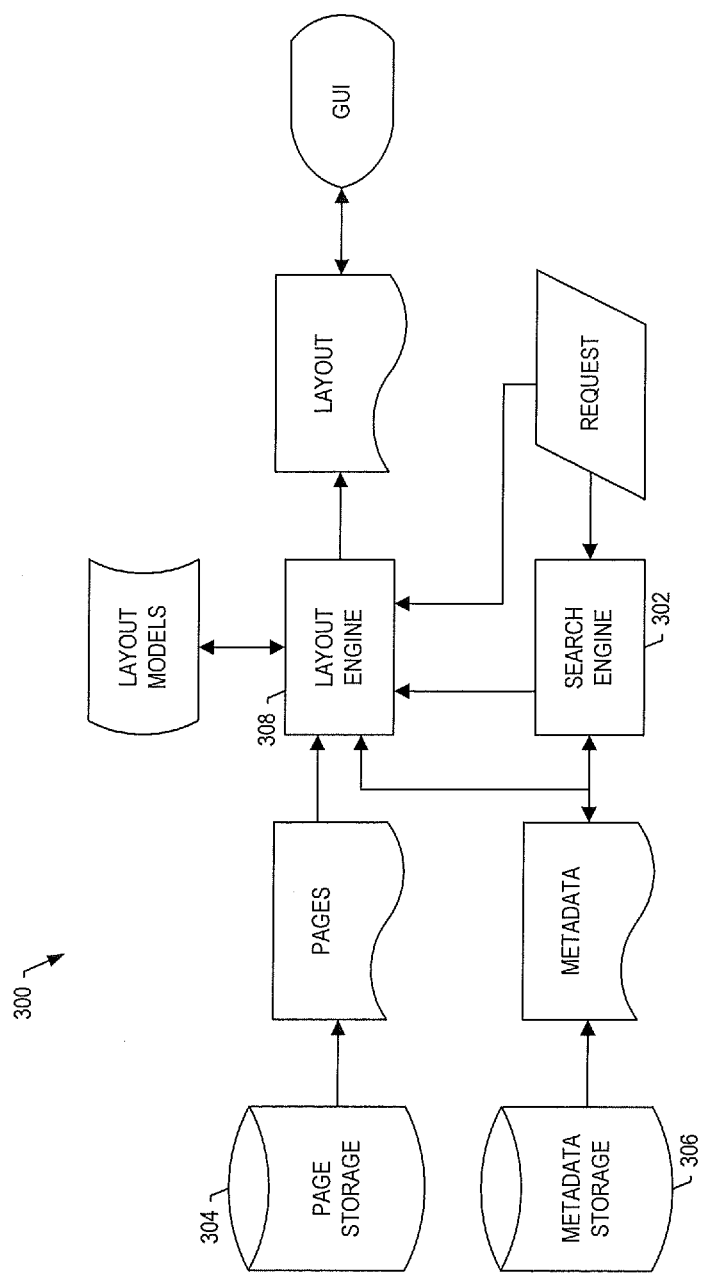
FIG. 3 is an illustration of a panoptic visualization document layout system in accordance with one example embodiment.

Reference is now made to FIG. 3, which illustrates a document layout system 300 according to one example embodiment. As indicated above, the document layout system 300 may be one example of the document layout system 104 of the panoptic visualization system 100 of FIG. 1. The document layout system may be generally configured to generate a layout of panoptically-arranged, logically-related pages of a panoptic visualization document collection. This collection may be, for example, the collection from the document collection system 102, or more particularly in one example, the document collection system 200 of FIG. 2.

As shown in FIG. 3, the document layout system 300 may include a search engine 302, request interface or the like configured to receive a request for media content and identify one or more pages including the requested media content. The identified page may be of a panoptic visualization document collection having a plurality of pages each of which includes respective media content and has associated metadata providing information about the respective page. The pages and metadata may be stored in respective storage 304, 306, which in one example may correspond to respective storage 206, 208 shown in FIG. 2.

The search engine 302 may be configured to identify page(s) in a number of different manners, such as based on the associated metadata of the pages of the collection. For example, the request may include a keyword matching or otherwise having relevance to a subject or object of page(s) of the collection. In response to the request, then, the search engine may be configured to search the metadata storage 306 for the associated metadata of one or more page(s) including media content matching or relevant to the request.

The document layout system 300 may also include a layout engine 308, layout generator or the like coupled to the search engine 302 and configured to select a layout model (style of presentation) from a plurality of layout models for panoptically-arranged pages of the plurality, including the identified page. The layout models may be maintained in a respective storage such as file storage, database storage, cloud storage or the like, and formatted and stored in any of a number of different manners according to the respective storage.

The layout models may include any of a number of different types of layouts for panoptically arranging pages. As indicated above and explained further below, examples of suitable layout models include brickwall, partial brickwall, hierarchy, shape, center out, top-down/triangulated, center-out triangulated, size dominance, overlap through detail, master-detail through depth, load shape, facet, mixed-media/static-and-dynamic or the like. Other examples may include combinations of one or more of the foregoing layout models.

The layout engine 308 may be configured to select the layout model in any of a number of different manners. In one example, the layout engine may be configured to select the layout model according to the associated metadata for the identified page. The search engine 302 may therefore be configured to communicate the associated metadata for the identified page to the layout engine, which in turn, may be configured to select a layout model according to the respective associated metadata.

As explained above, the associated metadata for a page may provide information about the type of document of which the page is a constituent, and/or information about media content of the page. In one example, then, the layout engine 308 may be configured to select the layout model according to the type of the document of which the identified page is a constituent (e.g., computer-aided design document, presentation document, graphics document, video document, legal document, book, article, web page, engineering diagram(s), technical drawing(s), wiring diagram(s), etc.). In another example, the layout engine may be configured to select the layout model according to the media content of the identified page, such as one or more of its subject(s) and/or object(s).

As also explained above, the associated metadata for a page may include information identifying link(s) between the page and other page(s) of the collection. The layout engine 308 may therefore also be configured to retrieve the identified page and other page(s) identified according to the associated metadata for the identified page. These pages may be retrieved from respective storage 304.

The layout engine 308 may be configured to generate a layout of the retrieved pages, panoptically-arranged according to the selected layout model, and the retrieved pages and their associated metadata. In addition to retrieving the pages, then, the layout engine of one example may also be configured to receive the associated metadata, such as from respective storage 306. The layout engine may then be configured to communicate the layout, such as to GUI in which a layout may be displayed, or a printer for generating a printout of the layout.

As suggested, the layout may define a panoptic arrangement of the retrieved pages according to the selected layout model. In the arrangement of the layout, the pages may each have a particular size, location and/or depth (z-order). The size, location and/or depth of each page of the layout may be absolute or relative to other page(s) of the layout, and may be specified or otherwise determinable in a number of different manners. In one example, the sizes, locations and/or depths may be specified or otherwise determinable from a definition of the selected layout model of the layout models. Additionally or alternatively, for example, the associated metadata for each page of the layout may provide information specifying the size, location and/or depth (z-order) of it in the layout, as explained above. In these examples, the layout engine 308 may be configured to generate the layout according to the sizes, locations and/or depths specified by the selected layout model and/or associated metadata of the pages of the layout.

The aspect ratios of the pages may be their native aspect ratios. In various instances, however, a layout model may specify or otherwise define, for each of one or more pages, an aspect ratio that is different from the native aspect ratio of the respective page. In these instances, the layout engine 308 may be further configured to generate the layout according to the different, non-native aspect ratio(s) for the page(s).

In one further example, one or more of the pages of the layout may be in a state including visual representations (e.g., sub-images) at respective resolutions. For each of these pages, the layout engine 308 may be configured to retrieve the page for the visual representation at the resolution that matches or most closely matches the size specified by the selected layout model and/or associated metadata. This may include, for example, retrieving the sub-image of the page at or closest to the respective resolution.

The layout generated by the layout engine 308 may be dynamically generated according to a selected layout model such that a different layout of the pages may be realized by changing the selected layout model. A different layout may also be realized in a number of other manners, such as based on associated metadata of the pages of the layout or one or more time-based factors. In one example, the layout engine may therefore be further configured to receive a request for a different panoptic arrangement of the retrieved pages. In this example, the layout engine may be configured to select a different layout model from the plurality of layout models in response to the request. The layout engine may then be configured to generate a different layout of the retrieved pages. This may include the layout engine being configured to panoptically rearrange the retrieved pages according to the selected different layout model, and the retrieved pages and associated metadata for the retrieved pages.

As suggested, page and metadata respective storage 304, 306 may be of any of a number of different types including, for example, database storage. In various examples described more fully below, the respective storage and layout engine 308 may be included within or otherwise coupled to a document database system such as document database system 100. In these examples, the document database system may cause the layout engine to select a layout model and generate a layout of the pages, panoptically-arranged, such as in a manner the same as or similar to that explained above or otherwise herein.

As indicated above, the layout models may include any of a number of different types of layouts for panoptically arranging pages. In the layout models, logical relationship(s) established by link(s) between pages may be expressed by the arrangement of pages, in either or both of location or depth (z-order). In one example, logical relationships may be expressed by the proximity of pages to one another in their locations, and/or in their relative depths. Additionally, one or more of the layout models may define or imply a navigation path between documents related to one another, and/or a load shape for loading pages of a layout generated according to the respective layout models. Reference will now be made to FIGS. 6-17, which schematically illustrate examples of suitable layout models. As shown, these examples include brickwall, partial brickwall, hierarchy, shape, center out, top-down/triangulated, center-out triangulated, size dominance, overlap through detail, master-detail through depth, load shape, facet, mixed-media/static-and-dynamic or the like.

Figure 6:
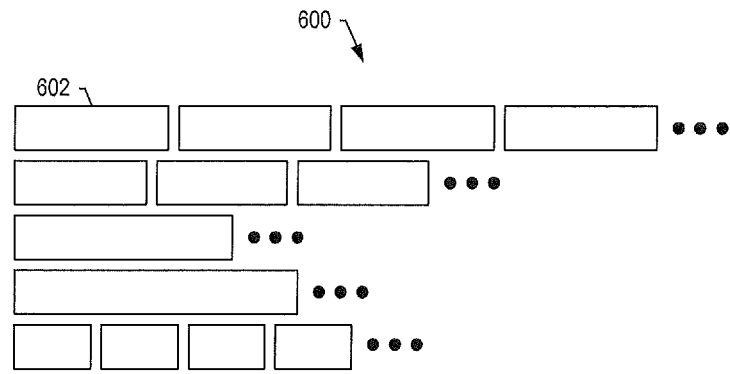

FIG. 6 illustrates a brickwall layout model 600 according to one example embodiment in which pages 602 may be arranged in one or more rows and one or more columns. As shown, the brickwall layout model may be characterized by a consistent end-to-end orientation with the pages being consistent in size and/or aspect ratio along one or more rows and/or columns. This type of layout model may be used for general search results. In one example, the layout model may provide a horizontal orientation related to chapter location, with a vertical orientation associated with a progressive increase in page length.

Although not separately shown, a partial brickwall layout model may be considered a superset of the brickwall layout model 600. The partial brickwall layout model may be characterized by clusters of pages that may similarly be consistent in size and/or aspect ratio at least within respective clusters. In this layout model, the clusters may be related by associated metadata of the respective pages, such as by their media content, author, time of creation, last revision or the like.

Figure 7:
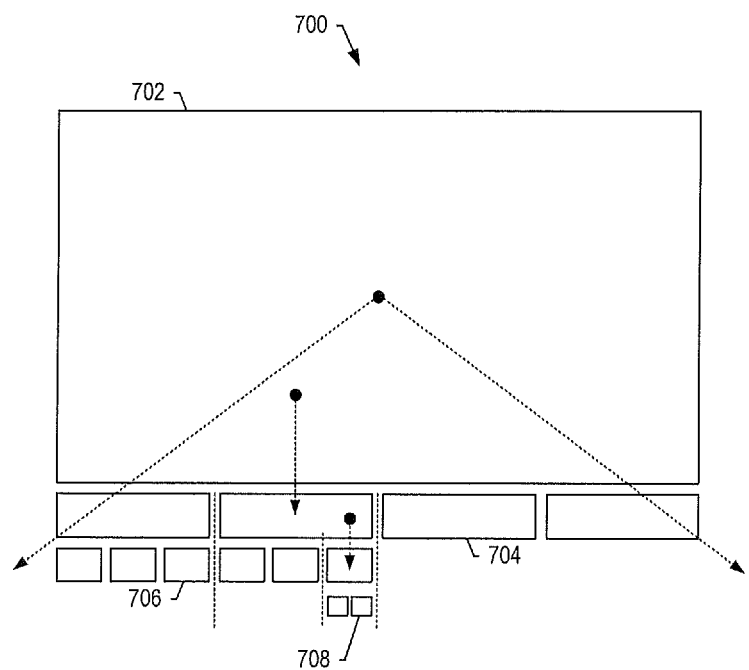

FIG. 7 illustrates a hierarchy layout model 700 according to one example embodiment in which pages may be arranged in a hierarchy in location and/or size. A hierarchical relationship between pages (hierarchically-related pages) may be indicated by their associated metadata in a number of different manners. For example, a hierarchical relationship may be indicated by a parent-child relationship between pages. In another example, a hierarchical relationship may be indicated by an object-subject or subject-object relationship in which an object of one page higher in a hierarchy may be subject(s) of other page(s) lower in the hierarchy, and in which at least some of the respective other page(s) may be at the same level in the hierarchy. In this example, the subject of the one page may be a master view, and the subject(s) of the other page(s) may be detailed view(s) of object(s) of the master view. In yet another example, a hierarchical relationship may be indicated by a relationship in which one page higher in a hierarchy includes reference(s) or link(s) (e.g., citation, hyperlink, etc.) to other document(s) lower in the hierarchy, in which at least some of the respective other document(s) may be at the same level in the hierarchy.

In one example of the hierarchy layout model 700, pages higher in a hierarchy may be located above those lower in the hierarchy (top-down), and/or may be larger in size than those lower in the hierarchy. The pages in this layout model may not be consistent in size or aspect ratio. Those pages higher in the hierarchy may dominate those lower in the hierarchy, and in which pages lower in the hierarchy may be constrained in the x-direction by the width of pages higher in the hierarchy.

More particularly, for example, the highest page 702 in the hierarchy may be located at the top, and may be sized according to the page's full resolution with its native aspect ratio. The next-highest page(s) 704 in the hierarchy may be located immediately below the highest page at a size smaller than the highest page, and with an aspect ratio that constrains the next-highest page(s) collectively to the width of the highest page. This pattern may repeat for the third-highest page(s) 706 in the hierarchy below respective ones of the next-highest pages, for the fourth-highest page(s) 708 in the hierarchy, and so forth. This layout model may in one example provide a single page with related pages cited in the respective page below it.

Figure 8:
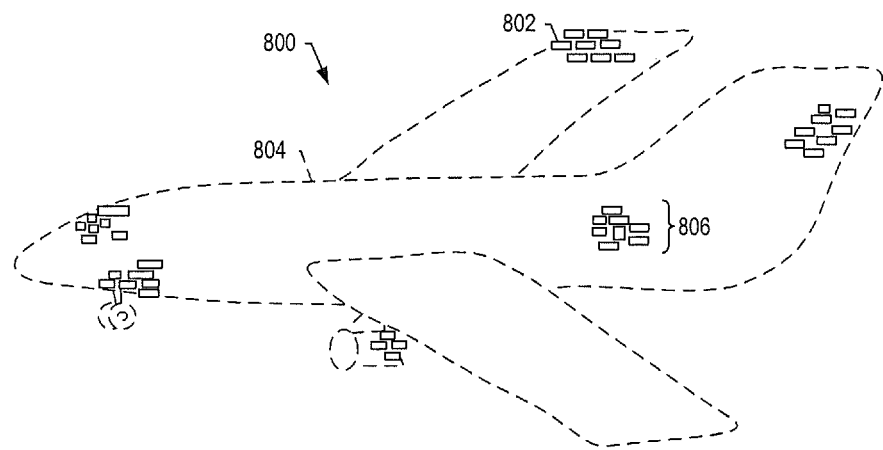

FIG. 8 illustrates a shape layout model 800 according to one example embodiment in which the model mimics a physical structure to which the pages relate, such as an aircraft or the geography of the United States. In one example, pages 802 may be arranged within boundaries of a visual representation 804 of the physical structure (two or three-dimensional representation), where the location(s) of page(s) may coincide with relationship(s) their media content to the structure. For example, pages related to the wing tip area of an aircraft (e.g., by subject or object) may be located in the respective area of the visual representation of the aircraft. In another example, pages related to court decisions from different states of the United States may be located in areas of the visual representation of the United States coinciding with the states in which the decisions were rendered.

In the shape layout model 800, in various instances, one or more subsets of the pages may be arranged in clusters 806 at respective areas of the visual representation of the physical structure. In these instances, the clusters may each be arranged according to another of the layout models, both in terms of location and size of the pages of the cluster.

Figure 9:
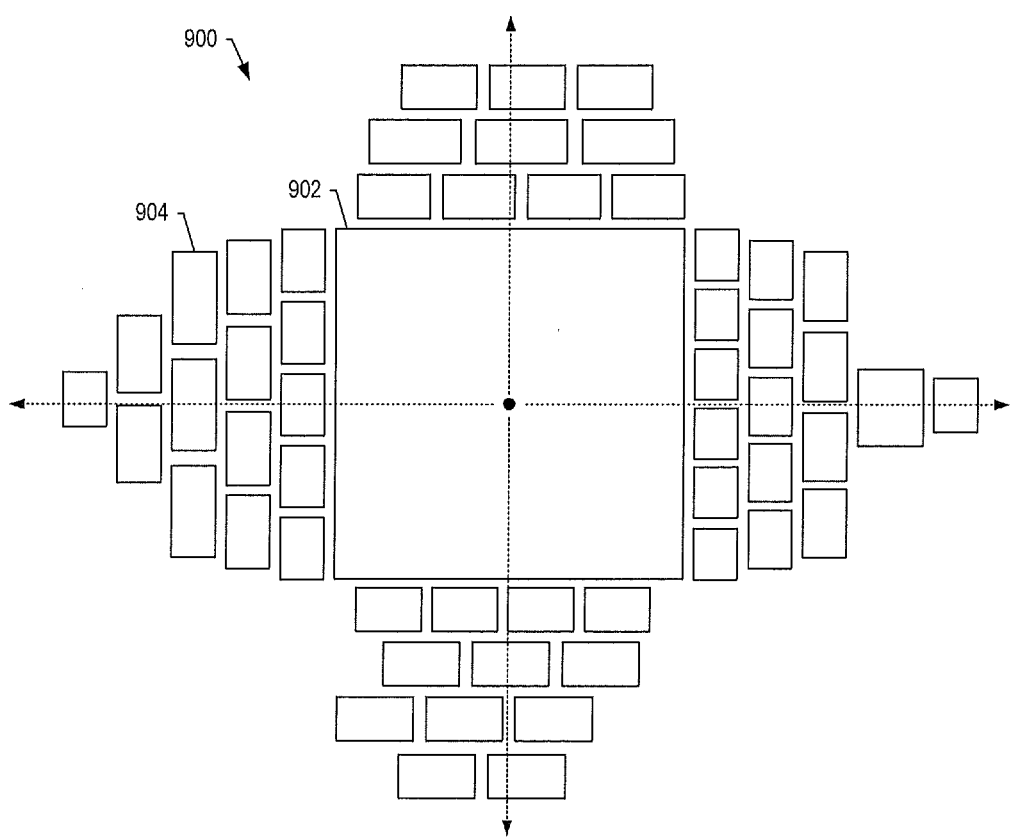

FIG. 9 illustrates a center-out layout model 900 according to one example embodiment. This layout model may be characterized by a dominating, centrally-located primary page 902—such as a page identified by a search engine (e.g., search engine 302) searching for media content. Pages 904 related to the primary page (e.g., hierarchically-related) may be located around the primary page in a 360-degree arrangement. The pages in this layout model may not be consistent in size or aspect ratio. In one example, this layout model may indicate that the primary page has a relation to pre (upper), post (lower) and contemporaneous (beside) pages. An example of this type of layout may be a collection of documents or web pages that have been cross-hyperlinked together with the pages being part of a document tree that leads to the center, primary page.

Figure 10:
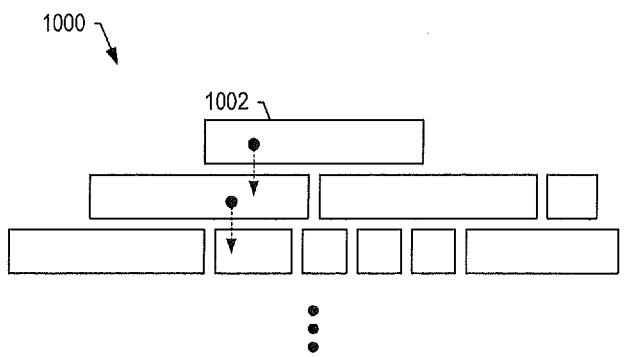

FIG. 10 illustrates a top-down/triangulated layout model 1000 according to one example embodiment. This layout model may be similar to a combination of the brickwall layout model 600 and hierarchy layout model 700, and may be characterized by a top-down arrangement of hierarchically-related pages 1002. Similar to the brickwall layout model, the pages in this layout model may be consistent in size and/or aspect ratio at least within pages at the same level of the hierarchy, which may indicate the importance of the pages relative to one another. Similar to the hierarchy layout model, in one example, pages higher in the hierarchy may be above (in the y-direction) pages lower in the hierarchy; but in contrast to the hierarchy layout model, the widths of the lower pages may not be constrained by the higher pages in the x-direction. In one example, the top-down/triangulated layout model may provide a single page as a node in a graph tree of related pages.

Figure 11:
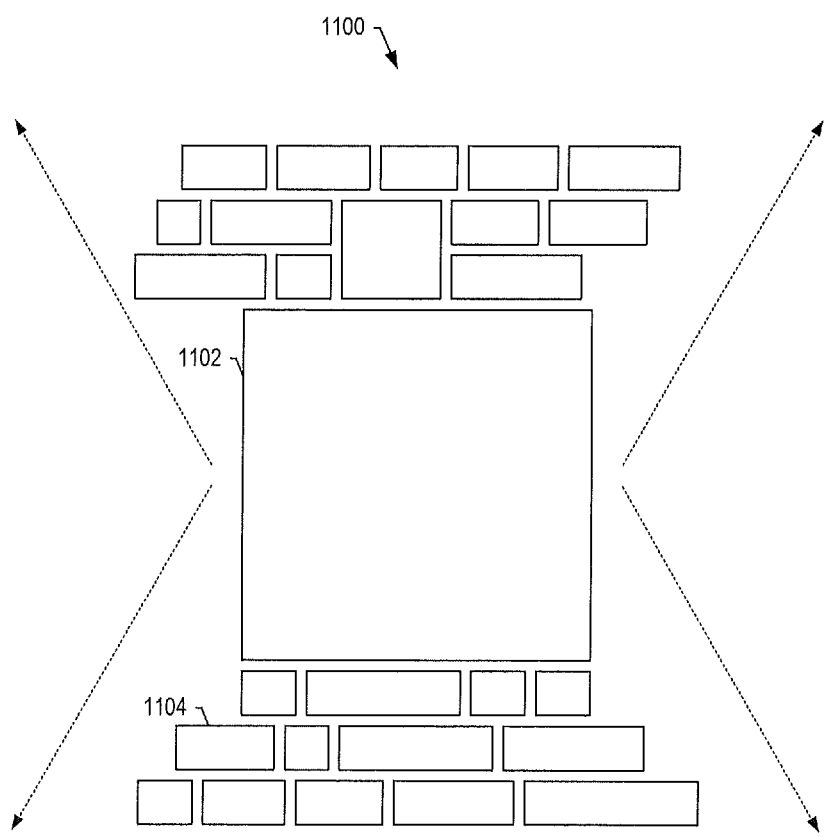

FIG. 11 illustrates a center-out triangulated layout model 1100 according to one example embodiment. This layout model may be characterized by a dominating, centrally-located primary page 1102, similar to the center-out layout model 900. In the center-out triangulated layout model, pages 1104 related to the primary page (e.g., hierarchically-related) may be located above and/or below the primary page. Also similar to the center-out layout model, the pages of the center-out triangulated layout model may not be consistent in size or aspect ratio. The center-out triangulated layout model may indicate that the primary page has a relation to the pre (upper) and post (lower) pages. An example of this type of layout may be a collection of documents or web pages that have been hyperlinked together with the upper pages being part of the document tree that leads to the center, primary page, and the lower pages leading from the primary page.

Figure 12:
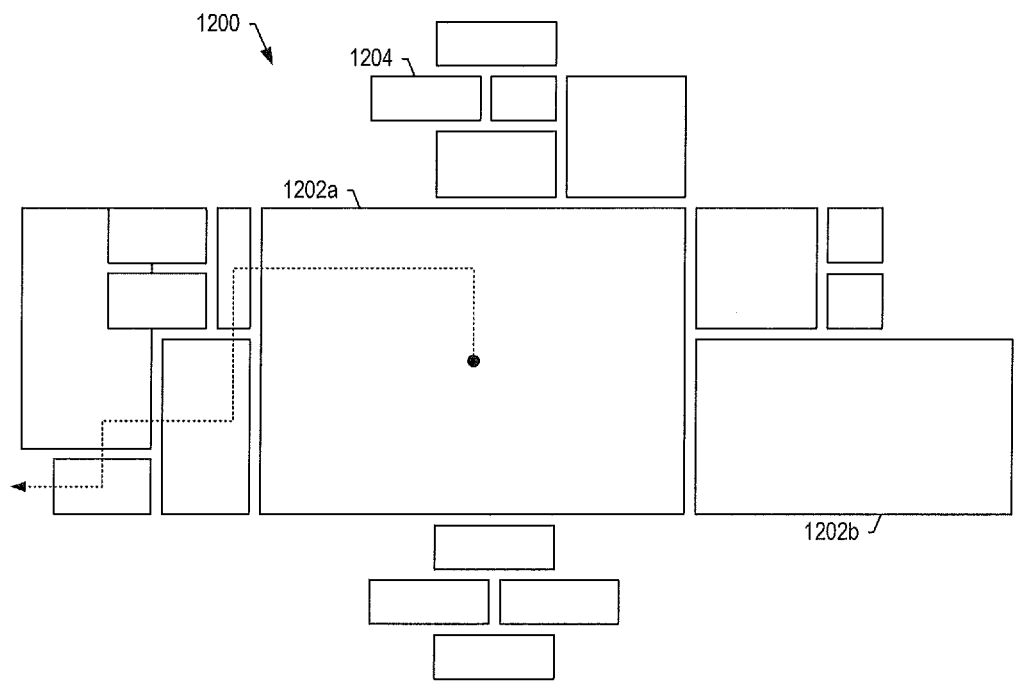

FIG. 12 illustrates a size-dominance layout model 1200 according to one example embodiment. This layout model may be similar to the center-out layout model 900. In this regard, the size-dominance layout model may be characterized by a dominating, centrally-located primary page 1202, and pages 1204 related to the primary page (e.g., hierarchically-related) located around the primary page in a 360-degree arrangement. This layout model, however, may include more than one primary page that may be the same size or different sizes, with two such pages 1202a, 1202b being shown. The pages in this layout model may not be consistent in size or aspect ratio. The size of the pages in this layout model may convey weight or relevance of the pages relative to one another. An example of this type of layout may be a collection of wiring diagrams that have associated reference(s) or link(s) on all four axes of at least the primary diagrams. The referenced/linked wiring diagrams/schematics may themselves include relationships to additional diagrams.

Figure 13:
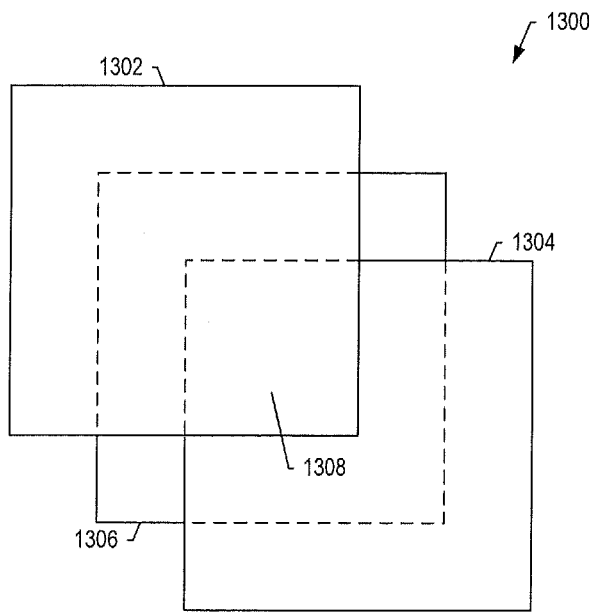

FIG. 13 illustrates an overlap-through-detail layout model 1300 according to one example embodiment. This layout model may be characterized by preservation of a hierarchical relationship between pages in the depth (z-order) in which they are arranged. In one example, a page 1302 higher in the hierarchy may overlay another page 1304 lower in the hierarchy, which in turn may overlay another page 1306 even lower in the hierarchy. In this layout, pages sharing one or more common objects or other media content may overlap 1308 so that the shared object(s)/other media content may at least partially spatially align across the pages.

Navigating a layout (or more particularly its visual presentation) may include zooming into or out of the presentation. Zooming into the layout according to the overlap-through-detail layout model 1300 may include increasing the size and, in various instances of one example, resolution of its pages. In this layout model, however, zooming into the layout may also include obscuring an overlaying page so that one or more overlaid pages (or rather the overlaid portions thereof) underneath it may come into view. Conversely, zooming out of a layout may also include showing an obscured overlaying page so that the respective page comes into view, and one or more overlaid pages (or rather the overlaid portions thereof) go out of view. In one example, obscuring a page may include increasing a transparency of the page (or decreasing its opacity) during a zoom-in, and showing a page may include increasing an opacity of the page (or decreasing its transparency) during a zoom-out.

In one example, as shown in FIG. 13, in an overlap-through-detail layout model 1300 including pages 1302, 1304, 1306, page 1302 may be obscured as a user zooms into the layout. At some point during the zoom-in, then, the respective page may no longer be viewable so that the layout appears to only include pages 1304, 1306. The zoom-in may further continue, obscuring page 1304 until it is no longer viewable, at which point the layout appears to only include page 1306. In these instances, obscured pages may remain in the layout, or the layout engine 308 may be configured to remove them from the layout.

Continuing the example of FIG. 13 in which only page 1306 is viewable and pages 1302, 1304 are obscured, page 1304 may be shown overlaying page 1306 as a user zooms out of the layout. At some point during the zoom-out, the respective page may be viewable so that the layout appears to include both pages 1304, 1306. The zoom-out may further continue, showing page 1302 until it is also viewable, at which point the layout appears to include pages 1302, 1304, 1306. In these instances, overlaid pages (or the overlaid portions thereof) may remain in the layout, or the layout engine 308 may be configured to remove them from the layout.

FIG. 14 illustrates a master-detail through depth layout model 1400 according to one example embodiment. This layout model is similar to the overlap-through-detail layout model 1300 in that a hierarchical relationship between pages may be preserved in their depth (z-order). In this layout model, however, an overlaid page (e.g., lower in the hierarchy) may be sized and arranged to be coincident with the entirety of an overlaying page (e.g., higher in the hierarchy).

Similar to the overlap-through-detail layout model 1300, navigation in the master-detail through depth layout model 1400 may include zooming into or out of the layout, which may further include obscuring or showing an overlaying page relative to an overlaid page. In the example shown in FIG. 14, navigating a layout including pages 1402, 1404, 1406 may include obscuring overlaying pages as a user zooms into the layout. Conversely, navigating the layout may include showing overlaying pages as the user zooms out of the layout. In this regard, implementing a zoom in the master-detail through depth layout model of multiple pages may be similar to implementing a zoom for a page including multiple sub-images.

Figure 15:
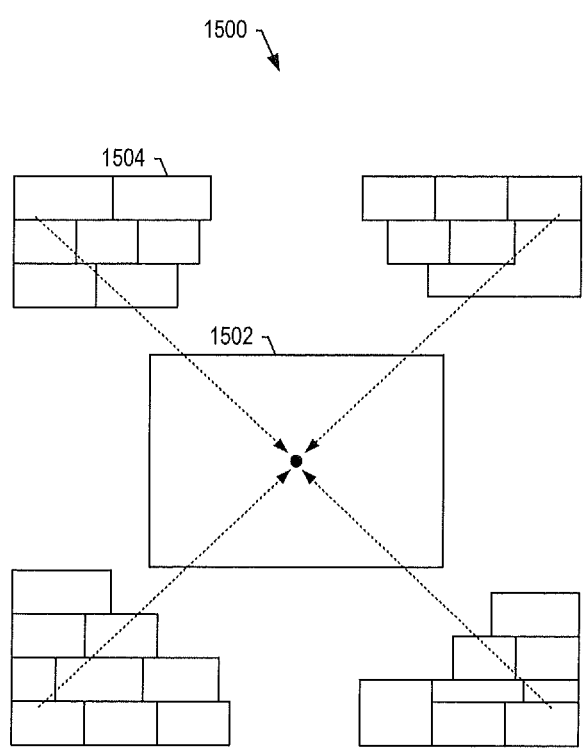

FIG. 15 illustrates a load-shape layout model 1500 according to one example embodiment. This layout model may be similar to some of the other layout models (e.g., center-out, center-out triangulated) including a dominating, centrally-located primary page 1502, and pages 1504 related to the primary page (e.g., hierarchically-related) located around, above and/or below the primary page. The pages in this layout model may not be consistent in size or aspect ratio. The load-shape layout model may be characterized by the timing of loading the layout (or more particularly its visual presentation). In this layout model, the non-primary pages may be loaded first, followed by the primary page.

An example of the load-shape layout model 1500 may be pages of media content related in time where pages of older media content may be loaded before the primary page of the most-current media content. The timing of media content in this context may relate to a time-aspect of the subject(s) or object(s) of the media content. For example, pages (e.g., pages 1504) for the preceding history of a court decision may be loaded before the court decision (e.g., page 1502) itself. In another example, the timing of media content may relate to the time of creation of the content, such as in the case of loading a first draft and one or more changes or revisions to a document (e.g., pages 1504) before the final or current version of the document (e.g., page 1502).

Figure 16:
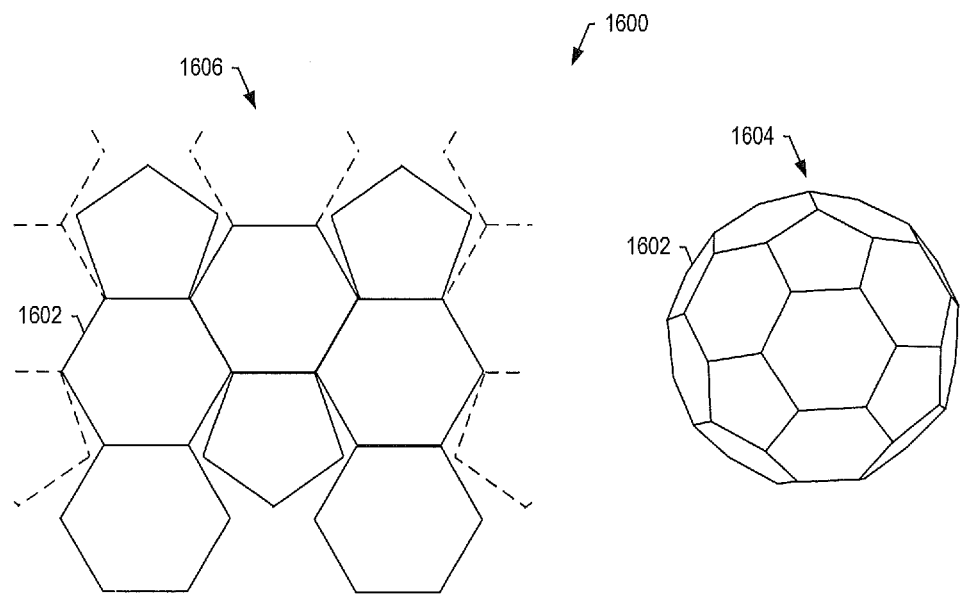

FIG. 16 illustrates a facet layout model 1600 according to one example embodiment. The facet layout model may be characterized by the arrangement of pages 1602 in a three-dimensional (3D) environment, such as in the context of facets of a 3D structure such as a truncated icosahedron 1604. For example, each page may be created from a set of x, y, z coordinates with a known consistent unit vector for orientation. Each page may then be placed in the layout in relation to a viewer's perspective. This layout model may be visually presented in three dimensions, or may be translated to a corresponding two-dimensional (2D) arrangement, such as a translated truncated icosahedron 1606.

Figure 17:
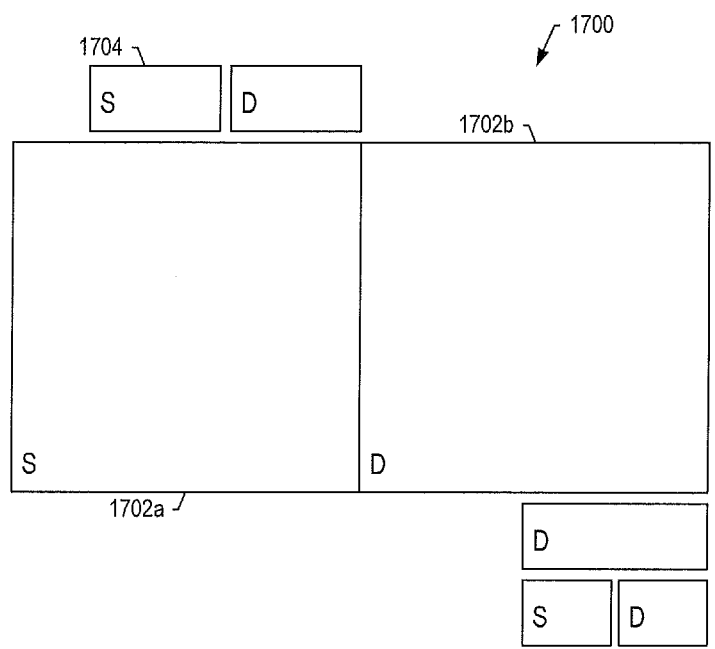

FIG. 17 illustrates a mixed-media/static-and-dynamic layout model 1700 according to one example embodiment. This layout model may be a subset of one or more other layout models in which the pages of a layout may include pages of mixed media types. For example, this layout model may include one or more static ("S") pages such as in the case of textual content or still images, and one or more dynamic ("D") pages such as in the case of video. FIG. 17 illustrates for example the mixed-media/static-and-dynamic layout model arranging mixed-media content in an arrangement similar to the size-dominance layout model 1200. As shown, this arrangement may include dominating, centrally-located primary pages 1702a, 1702b, and pages 1704 related to the primary pages (e.g., hierarchically-related) located around the primary pages.

Now turning back to FIG. 4, a document navigation system 400 is shown according to one example embodiment. As indicated above, the document navigation system 400 may be one example of the document navigation system 106 of the panoptic visualization system 100 of FIG. 1. The document navigation system may be generally configured to select and provide navigation option(s) for navigating a layout of pan-optically-arranged, logically-related pages of a panoptic visualization document collection. In one example, this may include the collection from the document collection system 102 (e.g., document collection system 200). Additionally or alternatively, for example, it may include the layout generated by the document layout system 104 (e.g., document layout system 300).

Figure 4:
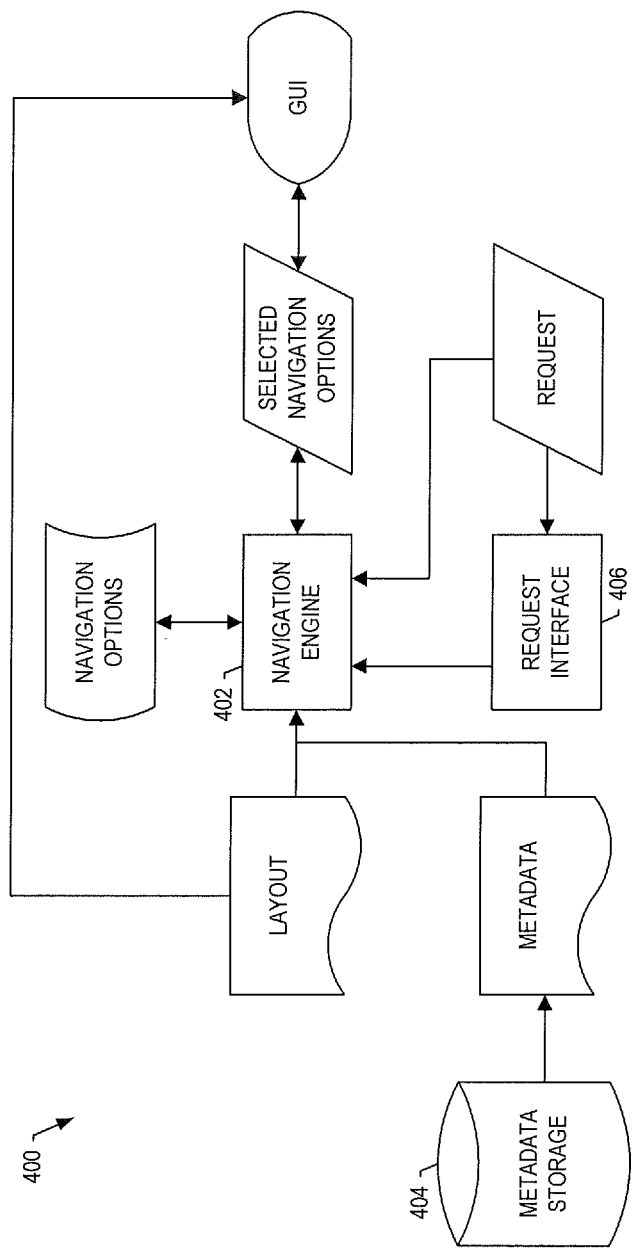
FIG. 4 is an illustration of a panoptic visualization document navigation system in accordance with one example embodiment.

As shown in FIG. 4, the document navigation system 400 may include a navigation engine 402 configured to receive a layout of pages (document components) of a panoptic visualization document collection. The collection may have a plurality of pages each of which includes respective media content and have associated metadata providing information about the respective page. The layout may include a panoptic arrangement of visual representations of the pages of the layout according to the associated metadata of the respective pages.

The navigation engine 402 may also be configured to select one or more navigation options from a plurality of navigation options for navigating the layout, in which the navigation options may be selected according to the associated metadata for the pages of the layout. The navigation options may be maintained in a respective storage such as file storage, database storage, cloud storage or the like, and formatted and stored in any of a number of different manners according to the respective storage. Similarly, the metadata for the pages of the layout may be stored in a respective storage 404, which in one example may correspond to either or both of storage 208, 306. The navigation engine may also be configured to communicate the selected navigation options, such as to a GUI in which the selected navigation options may be presented along with the layout.

In one example, the navigation engine 402 may be configured to select navigation options according to the type(s) of document(s) of which the pages of the layout are constituents, which may be indicated in the associated metadata for the pages. In one example, the navigation engine may be configured to select navigation options according to the media content of the pages of the layout, such as their subject(s) and/or object(s), which may also be indicated in the associated metadata. Examples of suitable navigation options for a layout include command tools (e.g., pan, rotate, zoom, obscure/show, home, etc.), annotation tools (e.g., timeline/milestone, callout, etc.), linking tools (hyperlink, hotlink, hotspot, etc.), navigation path tools (e.g., tracking, recording, etc.), metadata tools (e.g., search, filter, insertion, etc.), page tools (e.g., search, filter, cue, activation, size, location, dominance, logical relationship(s), etc.), layout-model change, co-navigation, hyper-hypo navigation, printing or the like.

The associated metadata for the pages of the layout may directly or indirectly affect the selected navigation options. In one example, the associated metadata may be retrieved to directly affect the navigation options selected by the navigation engine 402. Additionally or alternatively, for example, the associated metadata for the pages may affect their layout, such as by affecting a selected layout model according to which the layout may be generated. More particularly, for example, the layout of pages may be generated according to a layout model selected according to the type of document(s) of the pages, and/or media content of the pages. The layout may then affect the navigation options selected by the navigation engine. In either event of the associated metadata directly or indirectly affecting the selected navigation options, the navigation engine may be said to select navigation options according to the associated metadata for pages of the layout.

The document navigation system 400 may also include a request interface 404 coupled to the navigation engine 402 and configured to receive a request according to one or more of the selected navigation options. The request interface may be configured to communicate the request to the navigation engine. The navigation engine may in turn be further configured to effect an adjustment of the visual representation of the layout in response to the request and according to the request, and communicate the adjustment such as to the aforementioned GUI. In one example, the navigation engine may be configured to effect the adjustment of the visual presentation without adjustment of the layout itself. In another example, the navigation engine may be configured to effect the adjustment of the visual presentation including adjustment of the layout.

As suggested above, the selected navigation options may be affected by a layout and/or its pages, or in one more particular example, the associated metadata for the pages of a layout. In various instances, then, layouts of different pages may result in the selection of one or more different navigation options. For example, consider that the navigation engine 402 may at different times receive a layout of first pages and a separate layout of second pages, with each layout including a panoptic arrangement of respective pages. In this example, the navigation engine may select first navigation options for the first layout, and second navigation options for the second layout. The first and second pages may include one or more common pages, but in one example, may also include one or more different pages. In this example, the first and second layouts may be different at least in that the first and second pages include one or more different pages. And in turn, the first and second navigation options selected by the navigation engine may include one or more different navigation options—although similar to the first and second pages, the first and second navigation options may include one or more common navigation options.

Metadata storage 404 may be of any of a number of different types including, for example, database storage. In various examples described more fully below, the respective storage and navigation engine 402 may be included within or otherwise coupled to a document database system such as document database system 100. In these examples, the document database system may cause the navigation engine to select navigation option(s), and/or receive a request to and effect an adjustment of the layout (and/or metadata records), and communicate the adjustment, such as in a manner the same as or similar to that explained above or otherwise herein.

The navigation engine 402 may be configured to select any of a number of different navigation options for a layout of pages. Many layouts generated according to many different layout models, and including pages of many different types of documents, may include command tools such as pan, rotate, zoom, obscure/show, home or the like. In various instances, a portion but not all of a layout may be viewable in a GUI in which the layout is displayed. This may be the case, for example, in instances in which the size of the layout is greater than the viewable area of the GUI (sometimes referred to as a "view"), or in instances in which the layout is of pages in a 3D environment (e.g., facet layout model). In these instances, the navigation options may include panning and/or rotating to move the layout. This may include one or more pages of the layout coming into view, and may additionally or alternatively include one or more pages going out of view. Pages of the layout in view or coming into view may be retrieved and displayed, while pages out of view or going out of view may be removed from display. Further, in instances in which only a portion of a page is in view or comes into view, and in which pages are divided into tiles, only those tiles covering the viewable portion of the page may be retrieved and displayed.

The command tools may also include zooming into or out of a layout and thus its pages, which may include increasing or decreasing the size of the layout. This increasing or decreasing the size of the layout may in turn include increasing or decreasing the size(s) and, in various instances of one example, the resolution(s) of its pages.

In one example, pages of a layout may include sub-images at respective resolutions for zoom levels of the pages. In this example, the layout may include for each respective page, the sub-image of the page at the resolution that matches or most closely matches the page's size specified by a selected layout model and/or associated metadata. A zoom-in of the layout, then, may be effectuated by replacing the sub-images of its pages with respective sub-images at increased zoom levels, and hence increased resolutions. Conversely, a zoom-out of the layout may be effectuated by replacing the sub-images of its pages with respective sub-images at decreased zoom levels, and hence decreased resolutions.

In various examples, the zoom (in or out) of a page or layout may be capable at a finer increment than provided by zoom levels of the page or one or more pages of the layout. The zoom of a page (alone or as part of a layout) may be to an increment that relative to a sub-image of the page being displayed, another sub-image of the page matches or most closely matches the page's increased/decreased size. In these instances, for example, the zoom may be effectuated by replacing a sub-image of the page with a corresponding sub-image of the page at a higher/lower resolution. In other instances, however, the zoom may be to an increment that relative to a sub-image of the page being displayed, the same sub-image still most closely matches the page's increased/decreased size. In these instances, for example, the zoom may be effectuated by increasing the size of the sub-image of the page without replacing the sub-image with another at a higher/lower resolution.

In a further example, a page may not only include respective sub-images, but the sub-images across zoom levels may be divided into progressively larger numbers of tiles each of which covers a spatial area of the sub-image at a respective zoom level. In this example, a zoom-in of the layout may be effectuated by replacing the displayed tile(s) of its pages with the increased numbers of tiles covering the pages at higher zoom level(s). Conversely, a zoom-out of the layout may be effectuated by replacing the displayed tiles with the decreased numbers of tile(s) covering the pages at lower zoom level(s). Similar to palming a layout, zooming into or out of a layout may include one or more pages of the layout coming into view, and may additionally or alternatively include one or more pages going out of view. These pages may be handled in a manner similar to panning the layout, but at higher or lower zoom level(s).

In addition to increase or decrease in size/resolution of pages of a layout, for one or more layouts, the zoom option may implicate one or more other navigation options to further affect one or more of the pages. For example, the overlap-through-detail layout model 1300 and master-detail through depth layout model 1400 may implicate obscure/show options in which overlaying pages may be obscured or shown relative to overlaid pages during zoom-in and zoom-out, such as in the manner explained above with reference to FIGS. 13 and 14. It should be understood, however, that the obscure/show options may be utilized to obscure or show one or more pages of a layout independent of the zoom option, and independent of pages overlaying one another.

A number of navigation options including those command tools described above may effect an adjustment of the visual presentation of a layout. A home option may therefore permit a user to return to the visual presentation from the adjusted visual presentation.

The navigation options may include annotation tools such as timeline/milestone, callout or the like. These tools may permit a user to add annotations to a layout, and may be selected for a number of different layouts to different layout models, and including pages of many different types of documents. The timeline/milestone option in various examples may be more particularly applicable to pages logically related to one another in a time sequence. In one example, timeline/milestone may effect a visualization added to the layout that may relate pages of the layout as milestones in a timeline.

The navigation options may include linking tools such as hyperlink, hotlink, hotspot or the like. In accordance with the hyperlink option, one or more pages (each a source) may include reference(s) or link(s) to other page(s) or media content of other page(s) (the page(s) or media content being a target). The target page(s) or media content may be in the same layout, or in the same panoptic visualization document collection but perhaps not in the same layout. The target may even include page(s) or media content not in the same panoptic visualization document collection.

The hyperlink option may permit a source page to include inline in its media content, content linked from one or more other pages. This is sometimes more particularly referred to as a hot link. The hyperlink option may also permit a user to navigate from a source page to one or more target pages linked to the respective source page. In this regard, a hyperlink may be represented in any of a number of different manners, such as by text, graphic or the like. For example, media content of one page may be formatted as a hyperlink to another page or media content of another page. More particularly, for example, an object depicted in one page may be formatted as a hyperlink to another page that also depicts the object, or more directly to the object depicted in the other page. This type of hyperlink is sometimes referred to as a hotspot.

In addition to or in lieu of the foregoing, for example, the navigation options may include navigation path tools such as tracking, recording or the like. A navigation path according to example embodiments may be defined in any of a number of different manners. In one example, a navigation path may be defined by a sequence of a user panning, rotating, zooming and/or repositioning a layout or one or more of its pages, navigating from one page to another page or media content (hyperlink), or otherwise effecting an adjustment of the layout (or rather its visual presentation). The navigation path tools may permit tracking and/or recording a navigation path followed by a user, thereby creating a navigation history.

The navigation options of one example may include metadata tools such as search, filter, insertion or the like, which may operate with respect to the associated metadata for pages of the layout. The search and filter options may permit a user to search the associated layout for particular metadata, or filter the associated metadata to include or exclude particular metadata. The insertion option may permit the insertion of particular metadata to the visual presentation of the layout, such as in the form of a callout including the particular metadata referenced to page(s) for which the associated metadata includes the particular metadata.

The navigation options may include page tools such as search, filter, cue, activation, size, location, dominance, logical relationship(s) or the like. Similar to the metadata tools, the search and filter options may permit a user to search the pages of the layout for particular page(s) or particular media content. In this regard, the search and filter options may implicate the associated metadata for pages of the layout.

The cue option may permit the application of one or more visual effects to one or more pages to draw the user's attention to those page(s) in the layout. The visual effect may be any of a number of different effects. Examples of suitable visual effects include an opaque or translucent border of a noticeable color (e.g., yellow) around the page(s), an opaque or translucent visual object or shape smaller than and overlaying the page(s) or a translucent visual object or shape the same or greater in size than and overlaying the page(s), or the like. Examples of other suitable visual effects include an increase in a size of the page(s), an animation applied to the page(s), or the like.

The visual effect(s) may be triggered in any of a number of different manners, as may the page(s) to which the effect(s) are applied. For example, visual effect(s) may be triggered to indicate selection of one or more page(s). In this example, the visual effect(s) may be applied to the selected page(s). Additionally or alternatively in this example, visual effect(s) may be applied to page(s) having a particular logical relationship with the selected page(s) (e.g., share common document, subject and/or object, adjacency, object-subject subject-object, parent-child, reference/link, user specified, etc.). In another example, visual effect(s) may be applied to page(s) to indicate a navigation path followed by the user.

The activation option may be more particularly applicable to dynamic pages and may permit a user to trigger activity of one or more pages, such as by playing or otherwise controlling (e.g., rewind, fast forward, volume, mute, etc.) video content that may be included in such page(s).

Size, location and dominance options may permit a user to resize or otherwise rearrange one or more page(s) of a layout, which may in effect create a different layout.

These options may be applicable to a number of different layouts to different layout models, and including pages of many different types of documents. In one example, however, the dominance option may be more particularly applicable to layouts according to a layout model including a dominating page, such as hierarchy, center out, center-out triangulated, size dominance, load shape, mixed-media/static-and-dynamic or the like.

The logical relationship(s) option may permit a user to add, delete or otherwise change one or more logical relationships between pages, which may in turn effect a change in the layout of pages. These changes may or may not carry from navigation of a layout of pages to the associated metadata of those pages and any other similarly related pages. Thus, in one example, the changes may be temporary in that they are only applied to the layout of pages currently being visually presented. In another example, the changes may be more permanent in that they result in corresponding changes to the associated metadata for pages, which may not only result in a change in the currently presented layout but other layouts generated including the affected pages.

Further examples of navigation options may include layout-model change, co-navigation, hyper-hypo navigation, printing or the like. The layout-model change option may permit the user to change the layout model according to which the visually presented layout has been generated. This option may result in a rearrangement of the pages of the layout according to another layout model, thereby generating another layout. The co-navigation option may permit users of different instances of the same system to collaboratively navigate a layout of pages that may have been generated by one of the systems, but may be concurrently visually presented by both systems. The hyper-hypo navigation option may permit navigation between unique layout states or other pages that may not be part of the same panoptic visualization document collection as pages of the layout (hyper navigation), and/or navigation with a single layout state that may change as a result of that navigation (hypo navigation). And the printing option may permit the user to direct the visually-presented layout to a printer for generating a printout of it.

Figure 5:
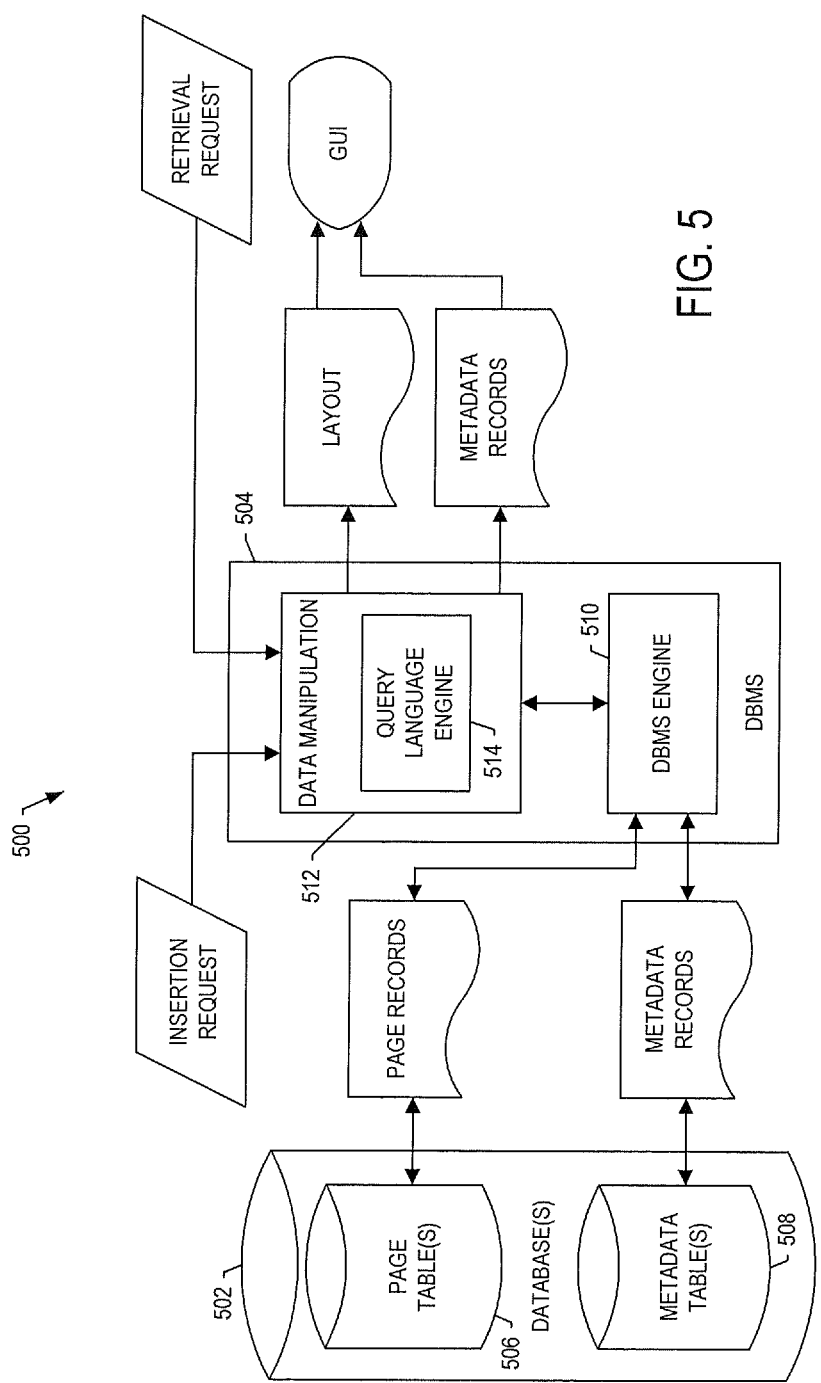
FIG. 5 is an illustration of a panoptic visualization document database system in accordance with one example embodiment.

Turning to FIG. 5, a document database system 500 is shown according to one example embodiment. The document database system may be one example of the document database system 108 of the panoptic visualization system 100 of FIG. 1. The document database system may be generally configured to create and manage database(s) of documents and/or their pages, which have been or may be collected as a panoptic visualization document collection. In one example, this may include the collection from the document collection system 102 (e.g., document collection system 200). Additionally or alternatively, for example, it may include the collection of which the document layout system 104 (e.g., document layout system 300) generates a layout; and/or it may include the collection, a layout of which the document navigation system 106 (e.g., document navigation system 400) selects and provides navigation options.

As shown in FIG. 5, the document database system 500 may include one or more databases 502 and a database management system (DBMS) 504. The database may be structured according to any of a number of different data models, such as the relational data model in which case the database may be referred to as a relational database. The database may be configured to store a panoptic visualization document collection having a plurality of pages each of which includes respective media content and has associated metadata providing information about the respective page. The pages and metadata may be stored in records (sometimes referred to as rows or tuples) of respective tables 506, 508 (sometimes referred to as relations), which in one example may correspond to respective storage 206, 208 shown in FIG. 2. The pages and metadata may be formatted as any of number of different data types in the database, such as numeric, date-and-time, string or the like. In one example, one or more of the pages may be stored as strings in the form of binary large objects (BLOBs), particularly in instances in which the pages include media content in the form of still images, video or the like. In a more particular example in which one or more pages include sub-images one or more of which may divided into tiles, the sub-images or tiles may be stored as respective BLOBs.

The DBMS 504 may be generally configured to manage the database 502, and in one example in the context of a relational database, the DBMS may be referred to as a relational database management system (RDBMS). The DBMS may be configured to control the organization, storage and retrieval of data in the database 502. The DBMS may also be configured to control the security and integrity of the database.

The DBMS 504 may include any of a number of different subsystems (each an individual system) for performing one or more functions or operations with respect to the database 502. As shown, for example, the DBMS may include a DBMS engine 510 generally configured to manage data in the DBMS, and data manipulation subsystem 512 generally configured to control adding, changing and deleting data in the database, as well as querying the database for data.

The data manipulation subsystem 512 may include a query language engine 514 that alone or in combination with a data manipulation language (DML) engine, may be configured to receive queries or requests to add, change and/or delete data in the database 502, and/or query the database for data. This request may be in the form of one or more query language statements, and the query language engine may be configured to translate the query language statements to a format understandable by the DBMS engine 510. In one example, the query language engine may include a parser and query optimizer. The parser may be configured to separating or otherwise breaking down the query language statements into basic units of syntax, and may ensure that the statements follow a number of syntax rules. The query optimizer may be configured to examine the query language statements and determine the most efficient manner of their execution.

The DBMS engine 510 may be configured to execute the query language statements, such as in the manner determined by the query optimizer of the query language engine 514. In one example, the DBMS engine may include a transaction manager and file manager. The transaction manager may be configured to enforce permissions and resolve or otherwise prevent conflicts within the document database management system 500. The file manager may be configured to control input/output operations on the database 502, depending on the request.

In various instances, the query language engine 514 of the data manipulation subsystem 512 may receive an insertion request to add data to the database 502. In one example, the query language engine may receive the insertion request from the document collection system 102 (e.g., document collection system 200). The request in this example may include one or more pages and their associated metadata, with at least the page(s) possibly having been compressed or otherwise processed by the document collection system, such as explained above. The DBS engine 510 may receive the request from the query language engine, and through its file manager, may store the page(s) and metadata in the database 502. For example, the file manager may store the page(s) and metadata in records of respective tables 506, 508 of the database.

In other examples, the query language engine 514 may include or otherwise be coupled to one or more of a document parser, colligater or tiler, such as the document parser 202, colligater 204 or tiler 210 of the document collection system 200. In one example, an insertion request may include document(s) received by the document parser, or in another example, may include the document's constituent pages from the document parser to the colligater. In another example, an insertion request may include the pages and metadata from the colligater to the tiler. The query language engine in these examples may cause the respective document parser, colligater and/or tiler to process the document(s), pages and metadata to a resulting panoptic visualization document collection. The query language engine may pass the request including the panoptic visualization document collection to the DBS engine 510, which through its file manager, may store the page(s) and metadata in the database 502.

In various other instances, the query language engine 514 of the data manipulation subsystem 512 may receive a retrieval request for data from the database 502, such as a request for one or more page records and associated metadata records from respective tables 506, 508 in the database. In one example, the query language engine search engine may be configured to identify one or more pages in a number of different manners. In one example, the retrieval request may specifically identify page(s) of a panoptic visualization document collection, or may identify one or more search criteria from which pages of the collection may be identified such as according to their associated metadata. In another example, the query language engine may be configured to identify page(s) in a manner similar to that explained above with respect to the search engine 302.

Similar to before, the DBS engine 510 may receive the request from the query language engine 514 and execute the request. In one example, the file manager of the DBS engine may be invoked to retrieve the respective page records and associated metadata records from respective tables 506, 508 in the database. The file manager may then be configured to pass the records back to the query language engine.

Again, in other examples, the query language engine 514 may include or otherwise be coupled to one or more of a document parser (e.g., document parser 202), colligater (e.g., colligater 204) or tiler (e.g., tiler 210). In one example, the retrieval request may be for document(s) from the database 502, which may or may not have yet been processed by the document parser, colligater or tiler. In another example, the retrieval request may be for pages of one or more documents, which pages may be from document(s) disassembled by the document parser but not yet processed by the colligater or tiler. In another example, the retrieval request may be for pages and associated metadata, which may have been processed by the parser and colligater but not yet processed by the tiler. The DBS engine 510 may retrieve and pass back to the query language engine, records for the requested document(s), pages and/or metadata. The query language engine in these examples may cause the respective document parser, colligater and/or tiler to process the document(s), pages and metadata to a resulting panoptic visualization document collection. The query language engine may then fulfill the request including pages and metadata from the panoptic visualization document collection, and reengage the DBS engine to store the processed pages and metadata in the database.

The query language engine 514 may include a layout engine, or may be otherwise coupled to a layout engine such as the layout engine 308 of the document layout subsystem 300. For the requested page records from the database 502, the respective layout engine may be configured to select a layout model and generate a layout of the pages in the page records, panoptically-arranged, such as in a manner the same as or similar to that explained above. In one example in which page(s) include sub-images, the query language engine may communicate the associated metadata records to the layout engine before requesting the page records from the database 502. The layout engine may then be configured to identify sub-image(s) of page(s) that matches or most closely match size(s) specified by the selected layout model and/or associated metadata, and may direct or otherwise cause the query language engine to request the record for the identified sub-image(s) from the database for generation of the layout.

The query language engine 514 may be configured to communicate the layout of pages along with their associated metadata records, such as to a GUI in which the layout and metadata records may be displayed (e.g., simultaneously displayed), or a printer for generating a printout including both the layout and metadata records. The metadata records in these cases may be arranged in any of a number of different manners, such as in a grid or table similar to the tables 508 in which the records may be stored.

In one example, the query language engine 514 may further include a navigation engine, or may be otherwise coupled to a navigation engine such as the navigation engine 402 of the document navigation system 400. In this example, the respective navigation engine may be configured to select one or more navigation options from a plurality of navigation options for navigating the layout generated by the layout engine of or coupled to the query language engine. The navigation engine may also be configured to receive a request according to one or more of the selected navigation options, effect adjustment of the layout (and/or metadata records) in response and according to the request, and communicate the adjustment. In this example, the query language engine or navigation engine may receive the request directly or via a suitable request interface (e.g., request interface 404).

The navigation options may be selected in a number of different manners, such as in a manner the same as or similar to that explained above. The query language engine may then be configured to communicate the selected navigation options, such as to a GUI in which the selected navigation options may be presented along with the layout.

The selected navigation options may include any one or more of those described above. In various instances, one or more of the selected navigation options may be not only for navigating the layout, but also for navigating the associated metadata records. For example, the cue option may permit application of visual effect(s) to one or more metadata records and/or pages of the layout, which may be triggered to indicate selection of one or more metadata records and/or pages. In this example, selection of a metadata record may cause application of visual effect(s) to the metadata record and/or the page with which it is associated. Similarly, selection of a page of the layout may cause application of visual effect(s) to the page and/or its associated metadata record. In other examples in which a navigation option effects a change in the layout of pages (e.g., logical relationship(s) option), the change may carry to the metadata records. In these examples, the data manipulation subsystem 512 of the DBMS 504 may control the change to the metadata records, which may also be reflected in the metadata records in the GUI.

To further illustrate example embodiments of the present invention, reference will now be made to FIGS. 18-23, which depict example layouts of pages that may be displayed in a GUI that has a predetermined viewable area, and which may be navigated by a user, according to an example embodiment of the present invention. FIGS. 18-20 and 23 illustrate an example of a layout according to the hierarchy layout model 700 displayed in a GUI that has a predetermined viewable area 1800 for presenting a layout. As shown, a layout according to the hierarchy layout model may include a plurality of pages 1802, each of which in one example may be a sub-image of the page at a respective resolution. Various ones of the pages may have different resolutions in the layout, with page 1804 having a higher resolution than pages 1806, which in turn have a higher resolution than pages 1808, which again in turn have a higher resolution than pages 1810.

The pages may be located and/or sized in the layout according to logical relationship(s) between the pages. In the example shown, the pages 1802 are engineering drawings of an aircraft, and may have object-subject relationships. More particularly, for example, object(s) of a page on a level of the hierarchy may be subject(s) of pages below it in the hierarchy, the subject(s) in one example being additional detail regarding the object(s).

More particularly, for example, page 1804 may depict an exterior view of the entire aircraft. Pages 1806 may depict a nose section, a landing gear assembly, a window, an engine assembly and a tail assembly. Pages 1808 may depict additional detail about the content of respective ones of pages 1806, and pages 1810 may depict additional detail about the content of respective ones of pages 1808. In the viewable area 1800, however, pages 1808, 1810 may be presented at a resolution that causes their media content to be only partially understood or not understood at all by a user. Of course, in other example embodiments, pages 1808 and/or pages 1810 may be presented at a sufficient resolution to interpret substantially all of their media content.

Figure 19:
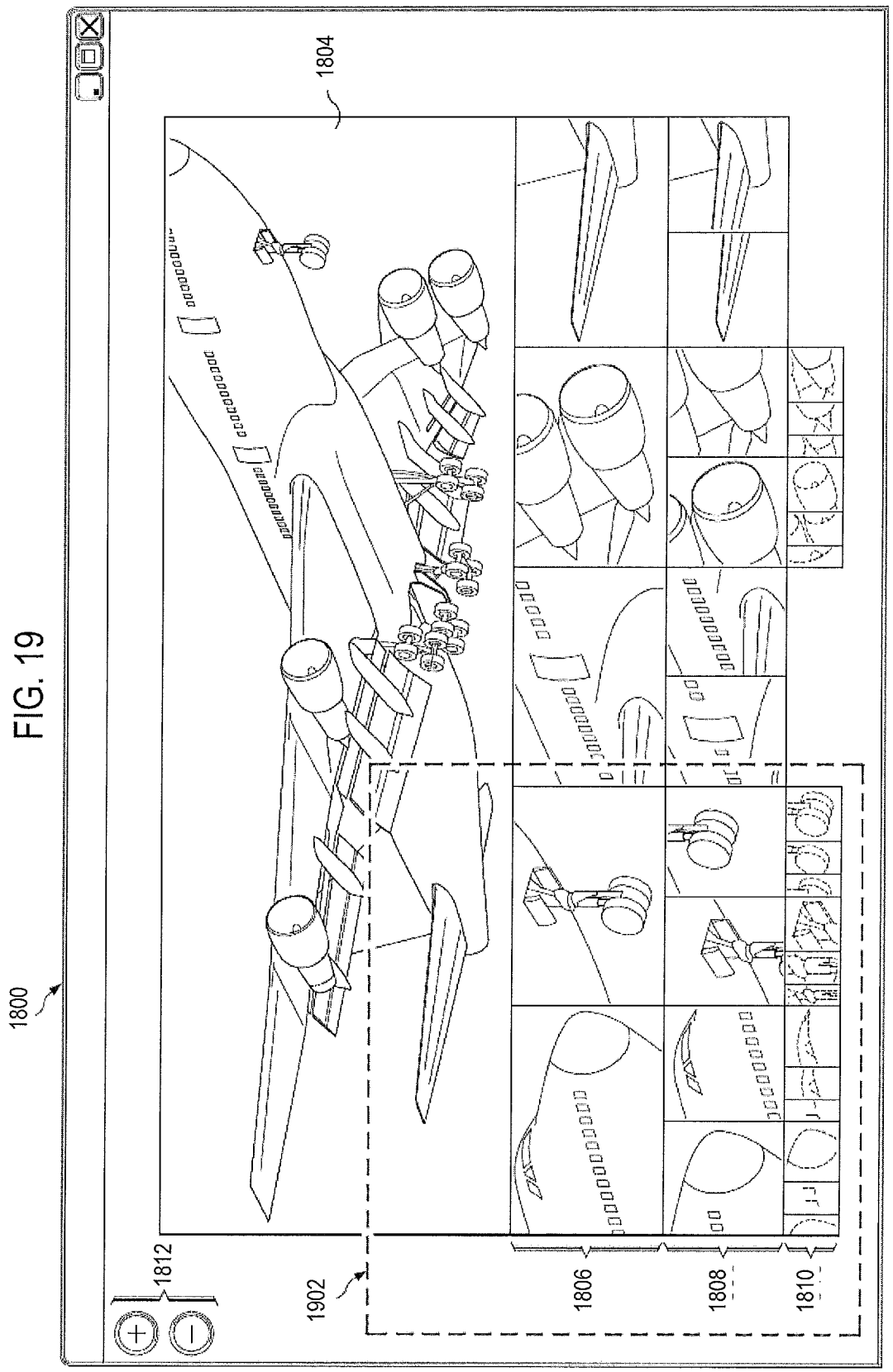

The GUI may present one or more selected navigation options for navigating the layout of pages 1802. In this illustrative example, pan and zoom navigation options may be presented in the form of controls 1812 to move and/or increase the size of the pages in the viewable area 1800 to focus on a portion 1814 of the layout. In other words, the user may activate the aforementioned controls to move and/or zoom the layout to fill a greater portion of the viewable area of the GUI with a portion of the layout. FIG. 19 illustrates one example of the result of navigating the layout in this manner.

As shown in FIG. 19, as the user activates controls 1812 to focus on the portion 1814 of the layout, the size of pages 1804-1810 may increase which, in one example, may include replacing sub-images of pages 1804-1808 with corresponding sub-images at higher resolutions. The resolution of the sub-images may allow the user to interpret substantially all of the presented media content. In this view, however, pages 1810 may not be presented with sufficient resolution to be interpreted by the user, because the size of the respective pages may not have been increased to a level implicating a next sub-image. That is, even after having increased the size of the image, the size may still most closely approximate the same sub-image so as to not cause its replacement with the next sub-image at a higher resolution. In this illustrative example, the user may again activate controls 1812 to move and/or resize the view to focus on an even smaller portion 1902 of the layout.

Figure 20:
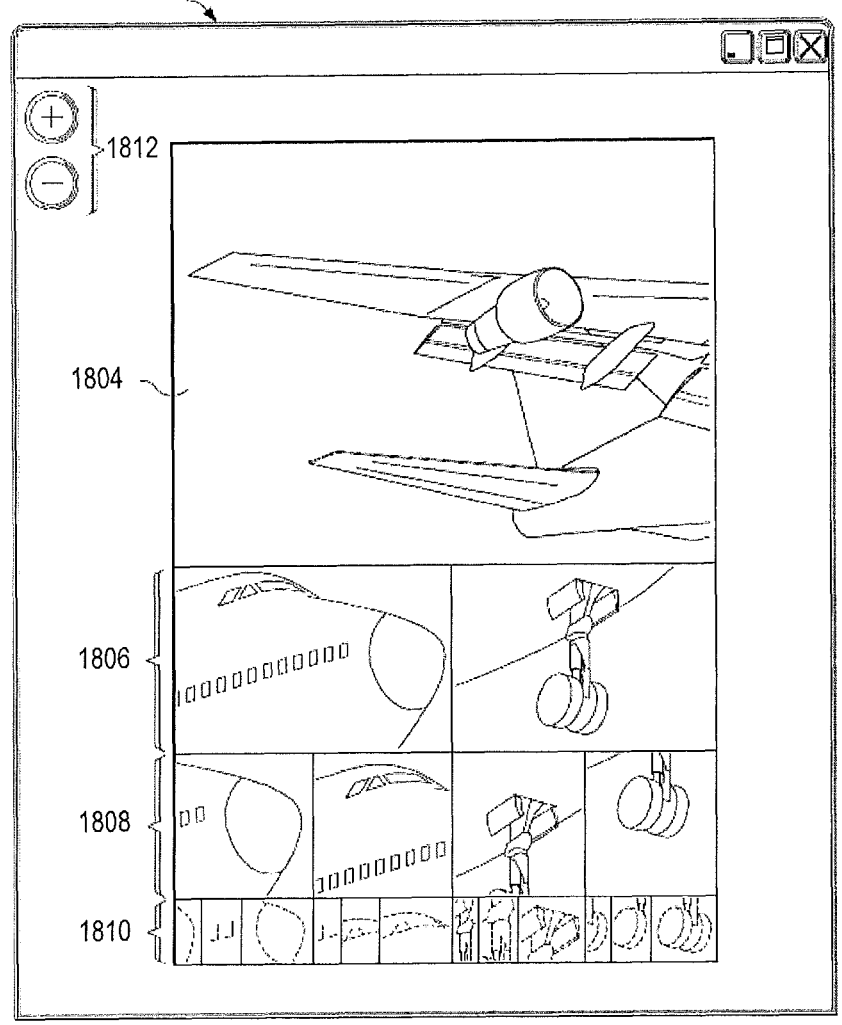

One example of the result of navigating the layout to focus on portion 1902 is shown in FIG. 20. In one example, the viewable area 2000 of the GUI may resize to more fully accommodate the focused portion of the layout. As the user activates the controls 1812 to focus on the portion 1902 of the layout, the size of pages 1804-1810 may increase, which in one example, may now further include replacing a sub-image of page 1810 with a corresponding sub-image at a higher resolution. The media content of page 1810 may now be sufficient to be interpreted by the user. In one example in which only a portion of page 1804 is within the viewable area of the GUI, and in which the respective page is divided into tiles, only those tiles covering the viewable portion of the respective page may be retrieved and displayed.

Figure 21:
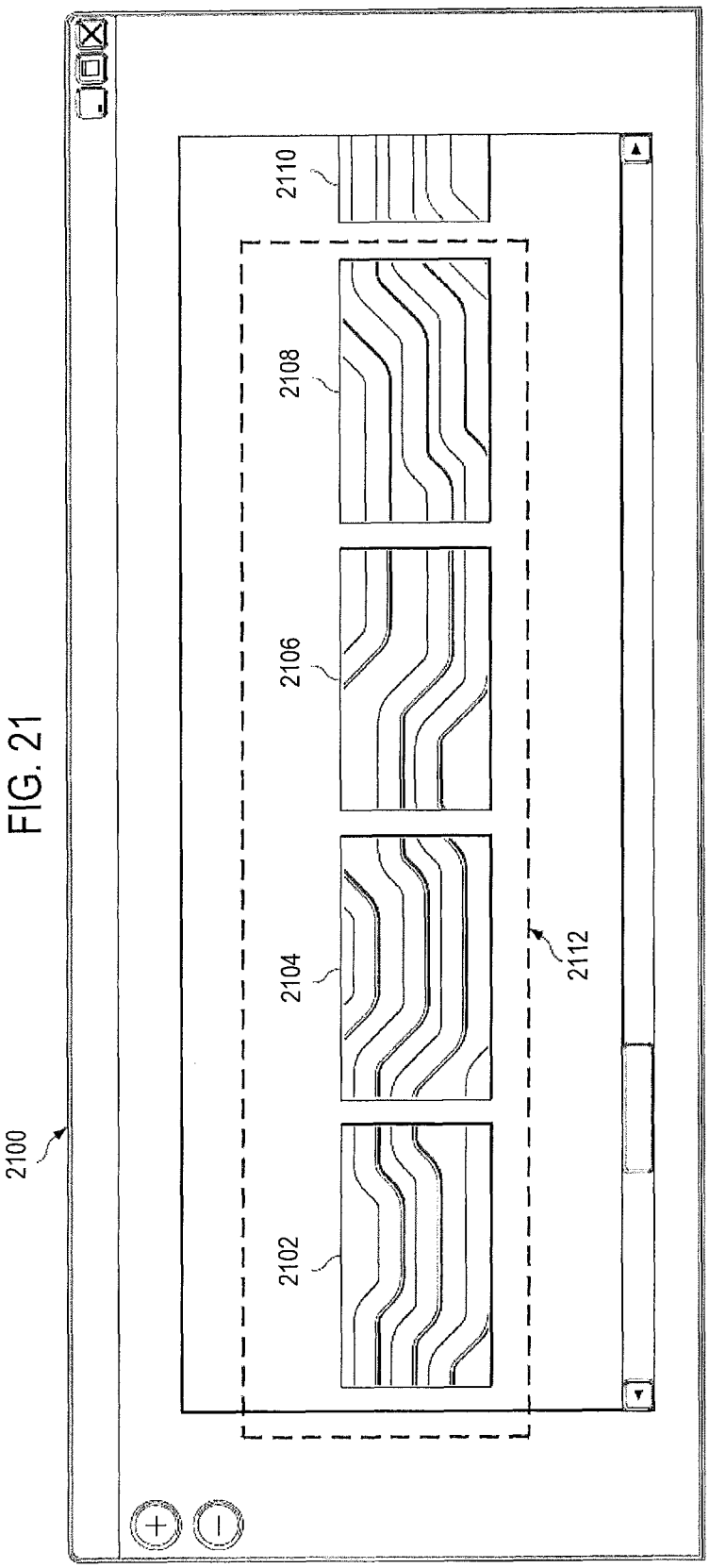

FIG. 21 illustrates an example of a layout according to the brickwall layout model 600 displayed in a GUI that has a predetermined viewable area 2100. The layout may include pages 2102-2110. In the example shown, the pages of the layout are wiring diagrams of a wiring system, which may be related by a spatial sequence. In this regard, page 2102 may depict wire(s) that connect to wire(s) depicted in page 2104. Page 2104 may in turn depict wire(s) that connect to wire(s) depicted in page 2106, and so forth for wire(s) of page 2106 to those of page 2108, and wire(s) of page 2108 to those of page 2110.

Pages of the layout entirely within the viewable area 2100 of the GUI may form or otherwise define an area or region of interest 2112. In one example, pages within the region of interest may be presented with an increased resolution relative to any pages outside the region of interest. As shown, the region of interest may include pages 2102-2108, but because only a portion of page 2110 is within the viewable area of the GUI, page 2110 may be considered outside the region of interest (although it may still be considered within the viewable area). In this instance, page 2110 may be presented at a lower resolution than the resolution(s) of pages 2102-2108.

Figure 22:
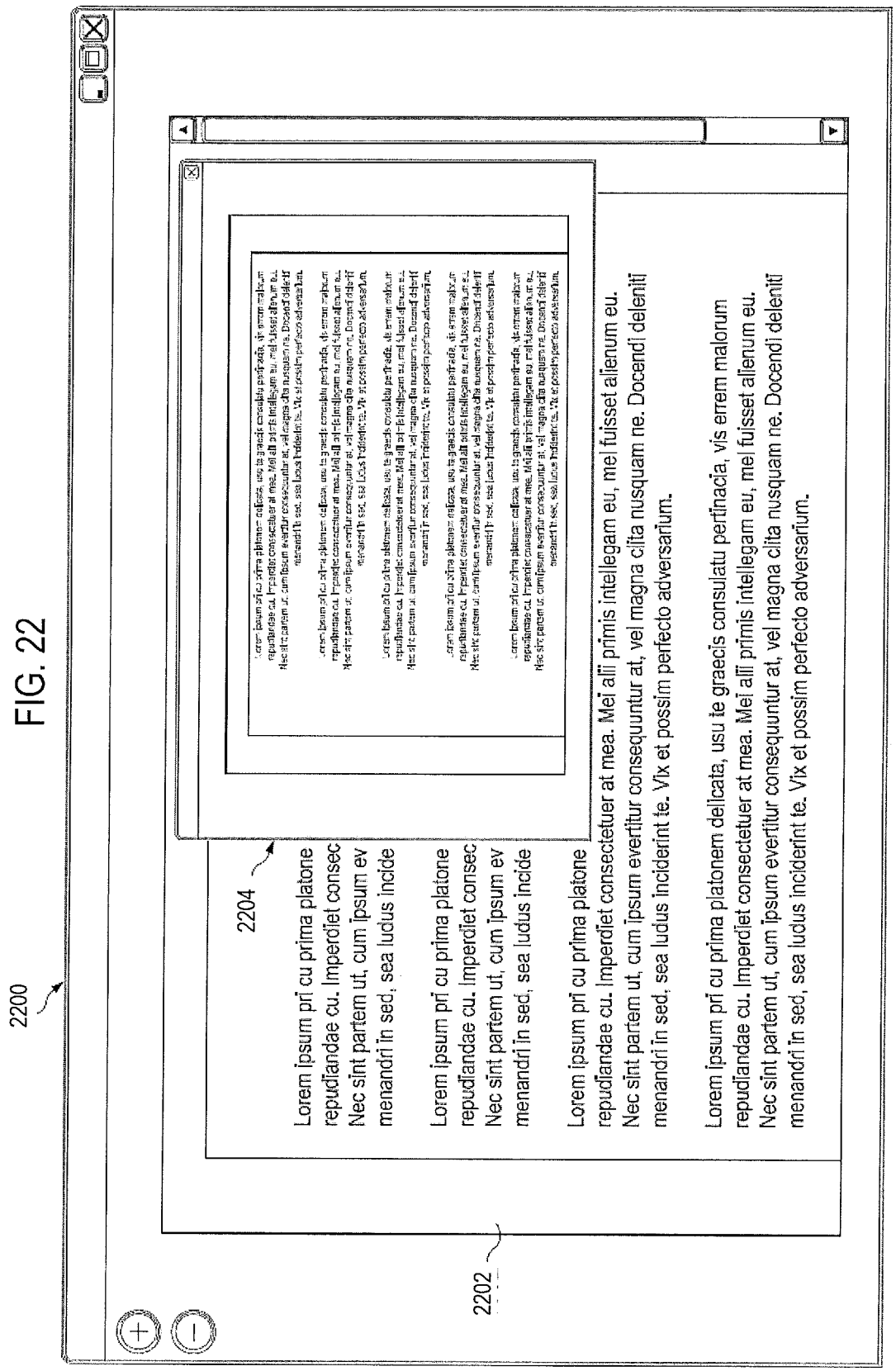

FIG. 22 illustrates an example of a layout according to the overlap-through-detail layout model 1300 displayed in a GUI that has a predetermined viewable area 2200. As shown, the layout includes pages 2202, 2204, and in which page 2202 may include a reference to page 2204. As shown, this hierarchical relationship may be maintained by the layout in which page 2204 (higher in the hierarchy) may partially overlay page 2202, and in one example, page 2204 may overlay page 2202 at the location of its reference in the respective page. As also shown, page 2204 may be presented smaller in size than page 2202, and may therefore be presented with a lower resolution than page 2202.

Figure 18:
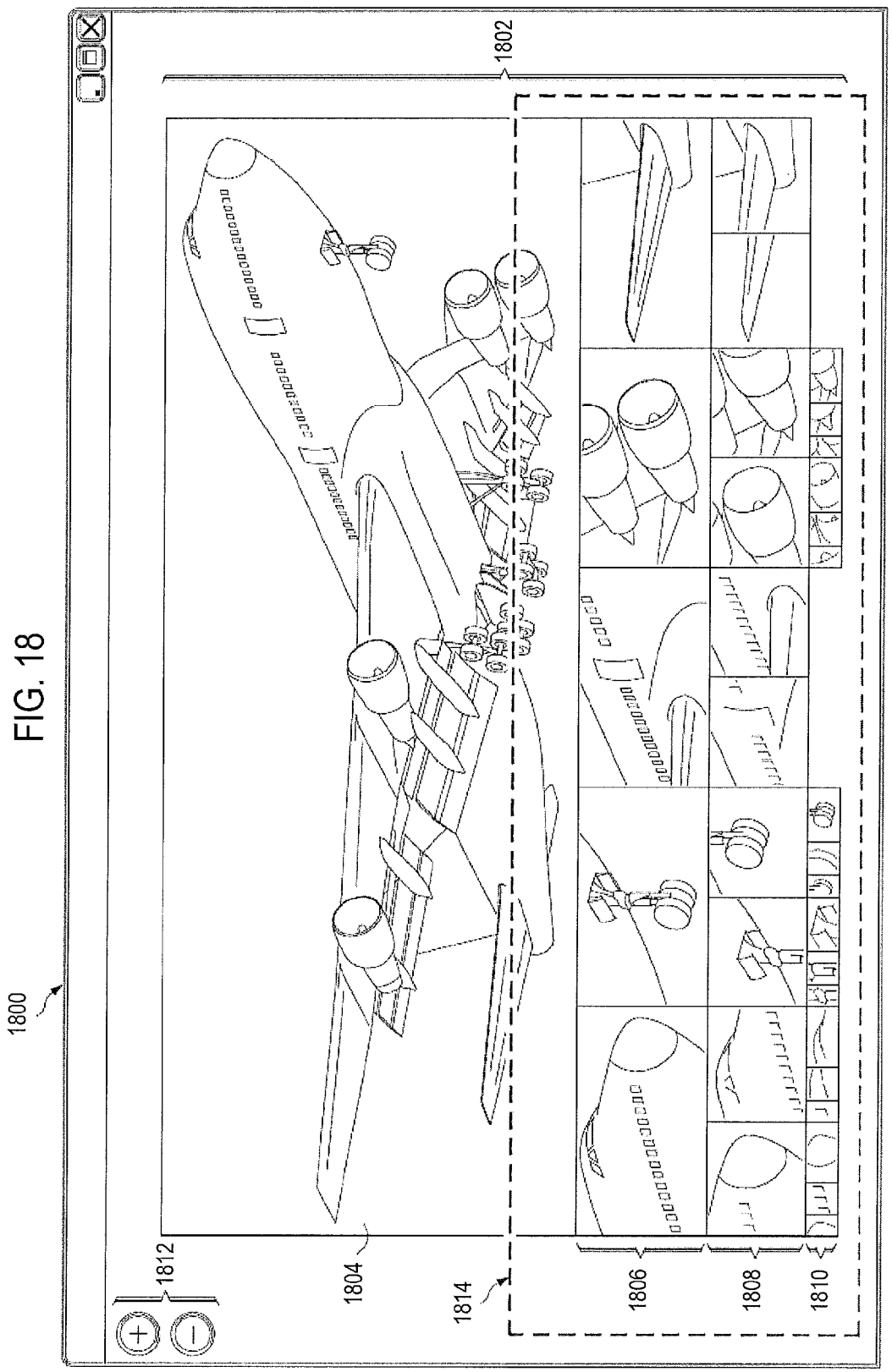
Figure 23:
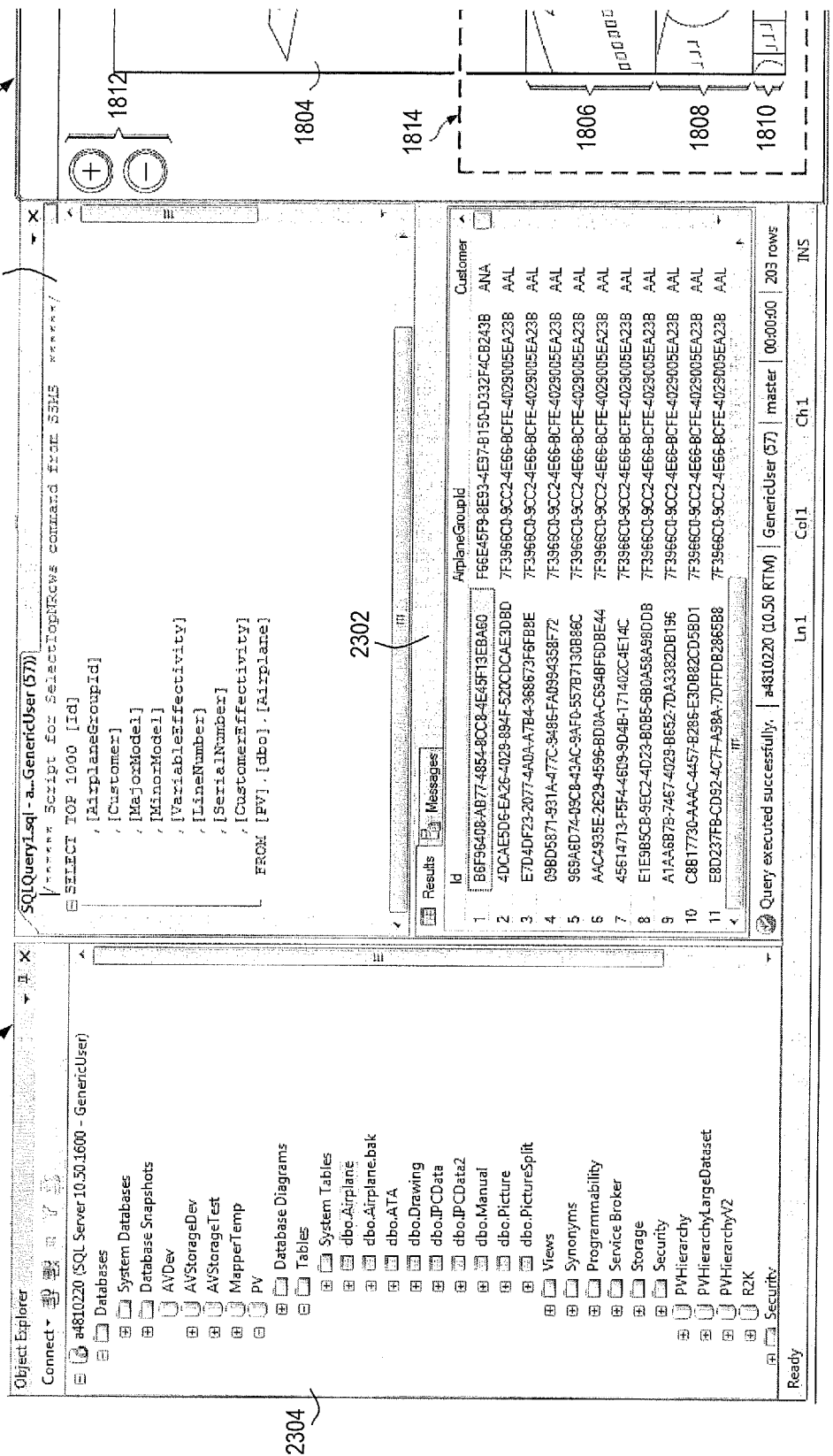

FIG. 23 again presents the example layout shown in FIGS. 18-20 but in a further example in which the layout is presented along with associated metadata records of the pages of the layout. In this example, the GUI may divide its overall viewable area 2300 into a plurality of panes for presenting respective information. One of the panes may be or otherwise include the viewable area 1800 (only a portion of which is shown in FIG. 23) for presenting a layout of pages, similar to that described above with respect to FIGS. 18-20. In another pane 2302, the GUI may include metadata records associated with pages in the layout. In this pane, the metadata records may be displayed in their entireties or may only be partially displayed, depending on the request from which the records were retrieved. Additionally, it should also be understood that metadata associated with any page may be stored in one or more metadata records, and consequently, the displayed metadata records may reflect only a portion of the records associated with the pages—again depending on the request.

In addition to the layout and metadata records, the GUI in one example may include a pane 2304 for browsing objects in the document database system 500, including the databases 502 and DBMS 504. From this pane, a database and in particular its tables 506, 508 may be browsed or otherwise searched for desired data such as one or more page records and/or metadata records. Additionally or alternatively, for example, the GUI may include a pane 2306 for presenting the request from which the page records of pages of the layout, and their associated metadata records, were retrieved from the database.

According to example embodiments of the present invention, the panoptic visualization system 100 and its subsystems including the document collection system 102, document layout system 104, document navigation system 106 and document database system 108 may be implemented by various means. Similarly, the examples of a document collection system 200, document layout system 300, document navigation system 400 and document database system 500, including each of their respective elements, may be implemented by various means according to example embodiments. Means for implementing the systems, subsystems and their respective elements may include hardware, alone or under direction of one or more computer program code instructions, program instructions or executable computer-readable program code instructions from a computer-readable storage medium.

In one example, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary embodiments of the present invention may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor (e.g., processor unit) connected to a memory (e.g., storage device).

The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

As explained above, example embodiments of the present invention permit the collection, layout and/or navigation of a large number of pages (or documents). Example embodiments may allow a user to simultaneously and quickly view and visually search a large number of pages while using less bandwidth than retrieving all of the pages. In instances in which a user may generally have an idea of the appearance of page(s) of interest, or have an idea of a logical relationship between the respective page(s) and other pages, a layout of pages may be generated and/or navigated to allow the user to locate and use page(s) of interest. The user may view and navigate pages as though they were laid out in the physical world without the physical space requirement involved with large collections of pages.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for implementation of a panoptic visualization document database system, the apparatus comprising a processor and a memory storing executable instructions that in response to execution by the processor cause the apparatus to implement at least:

a database management system engine configured to manage a database having stored therein a panoptic visualization document collection of a plurality of document components that are groupings of media content of one or more electronic documents between basic breaking points, each document component including respective media content, and having associated metadata providing structured information about the document component, the document components and metadata being stored in respective records of the database, the document components being stored as strings in the form of binary large objects;

a data manipulation subsystem coupled to the database management system engine and including a query language engine configured to receive a request for the respective records of a subset of the document components and associated metadata from the database, wherein the database management system engine is configured to execute the request, including being configured to retrieve the requested, respective records from the database; and a layout engine of the query language engine or coupled to the query language engine, the layout engine being configured to generate a layout of panoptically-arranged images of document components including the subset of the document components stored in the retrieved, respective records according to a layout model, and the retrieved, respective records of the subset of the document components and associated metadata, the images of document components including images of the respective media content thereof, wherein the query language engine is configured to communicate the layout and retrieved, respective records of the associated metadata.

2. The apparatus of claim 1, wherein the layout engine is configured to select the layout model from a plurality of layout models, the layout model being selected according to the retrieved, respective records of the associated metadata.

3. The apparatus of claim 1, wherein the associated metadata for the subset of the document components provides structured information about a type of the one or more electronic documents of the panoptic visualization document collection, the layout engine being configured to select the layout model according to the type of the one or more electronic documents.

4. The apparatus of claim 1, wherein the associated metadata for the subset of the document components provides structured information about the media content of the subset of the document components, the layout engine being configured to select the layout model according to the media content of the subset of the document components.

5. The apparatus of claim 1, wherein the associated metadata for each document component of the subset of the document components provides structured information specifying one or more of a size, location or depth of the image of the document component in the layout, and
wherein for each document component of the subset of the document components, the layout engine is configured to generate the layout according to the one or more of the size, location or depth specified by the structured information provided in the associated metadata.

6. The apparatus of claim 5, wherein for each document component of one or more document components of the subset of the document components, the one or more of the size, location or depth is specified relative to one or more others of the subset of the document components.

7. The apparatus of Claim 1, wherein the query language engine is configured to communicate the layout and retrieved, respective records of the associated metadata to a graphical user interface for simultaneous display of the layout and retrieved, respective records thereby.

8. A method comprising:
managing a database having stored therein a panoptic visualization document collection of a plurality of document components that are groupings of media content of one or more electronic documents between basic breaking points, each document component including respective media content, and having associated metadata providing structured information about the document component, the document components and metadata being stored in respective records of the database, the document components being stored as strings in the form of binary large objects;

receiving a request for the respective records of a subset of document components and associated metadata from the database, and executing the request, including retrieving the requested, respective records from the database;

generating a layout of panoptically-arranged images of document components including the subset of the document components stored in the retrieved, respective records according to a layout model, and the retrieved, respective records of the subset of the document components and associated metadata, the images of document components including images of the respective media content thereof; and communicating the layout and retrieved, respective records of the associated metadata.

9. The method of claim 8 further comprising selecting the layout model from a plurality of layout models, the layout model being selected according to the retrieved, respective records of the associated metadata.

10. The method of claim 8, wherein the associated metadata for the subset of the document components provides structured information about a type of the one or more electronic documents of the panoptic visualization document collection, the layout model being selected according to the type of the one or more electronic documents.

11. The method of claim 8, wherein the associated metadata for the subset of the document components provides structured information about the media content of the subset of the document components, the layout model being selected according to the media content of the subset of the document components.

12. The method of claim 8, wherein the associated metadata for each document component of the subset of the document components provides structured information specifying one or more of a size, location or depth of the image of the document component in the layout, and
wherein for each document component of the subset of the document components, the layout is generated according to the one or more of the size, location or depth specified by the structured information provided in the associated metadata.

13. The method of claim 12, wherein for each document component of one or more document components of the subset of the document components, the one or more of the size, location or depth is specified relative to one or more others of the subset of the document components.

14. The method of claim 1, wherein the layout and retrieved, respective records of the associated metadata are communicated to a graphical user interface for simultaneous display of the layout and retrieved, respective records thereby.

15. A computer-readable storage medium that is non-transitory and has computer-readable program code portions stored therein that, in response to execution by a processor, cause an apparatus to at least:

manage a database having stored therein a panoptic visualization document collection of a plurality of document components that are groupings of media content of one or more electronic documents between basic breaking points, each document component including respective media content, and having associated metadata providing structured information about the document component, the document components and metadata being stored in respective records of the database, the document components being stored as strings in the form of binary large objects;

receive a request for the respective records of a subset of the document components and associated metadata from the database, and execute the request, including the apparatus being caused to retrieve the requested, respective records from the database;

generate a layout of panoptically-arranged images of document components including the subset of the document components stored in the retrieved, respective records according to a layout model, and the retrieved, respective records of the subset of the document components and associated metadata, the images of document components including images of the respective media content thereof; and communicate the layout and retrieved, respective records of the associated metadata.

16. The computer-readable storage medium of claim 15, wherein the computer-readable storage medium has further computer-readable program code portions stored therein that, in response to execution by the processor, cause the apparatus to further select the layout model from a plurality of layout models, the layout model being selected according to the retrieved, respective records of the associated metadata.

17. The computer-readable storage medium of claim 15, wherein the associated metadata for the subset of the document components provides structured information about a type of the one or more electronic documents of the panoptic visualization document collection, the layout model being selected according to the type of the one or more electronic documents.

18. The computer-readable storage medium of claim 15, wherein the associated metadata for the subset of the document components provides structured information about the media content of the subset of the document components, the layout model being selected according to the media content of the subset of the document components.

19. The computer-readable storage medium of claim 15, wherein the associated metadata for each document component of the subset of the document components provides structured information specifying one or more of a size, location or depth of the image of the document component in the layout, and wherein for each document component of the subset of the document components, the apparatus being caused to generate the layout includes being caused to generate the layout according to the one or more of the size, location or depth specified by the structured information provided in the associated metadata.

20. The computer-readable storage medium of claim 19, wherein for each document components of one or more document components of the subset of the document components, the one or more of the size, location or depth is specified relative to one or more others of the subset of the document components.

21. The computer-readable storage medium of claim 15, wherein the apparatus is caused to communicate the layout and retrieved, respective records of the associated metadata to a graphical user interface for simultaneous display of the layout and retrieved, respective records thereby.

22. The apparatus of claim 1, wherein the document components of the layout include an identified document component and one or more other document components identified according to the associated metadata of the identified document component, and wherein the associated metadata of the identified document component includes information identifying one or more links between the identified document component and respective one or more other document components, and including a unique identifier for each of the respective one or more other document components.

* * * * *